(12) United States Patent
Tu et al.

(10) Patent No.: US 8,908,834 B2
(45) Date of Patent: Dec. 9, 2014

(54) METHOD, APPARATUS, AND SYSTEM FOR REDUCING DIGITAL SUBSCRIBER LINE INTERFERENCE

(71) Applicant: Huawei Technologies Co., Ltd., Shenzhen (CN)

(72) Inventors: Jianping Tu, Shenzhen (CN); Jie Lv, Wuhan (CN); Jinxiong Lv, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 14/266,522

(22) Filed: Apr. 30, 2014

(65) Prior Publication Data
US 2014/0233710 A1    Aug. 21, 2014

Related U.S. Application Data

(63) Continuation of application No. PCT/CN2011/081715, filed on Nov. 3, 2011.

(51) Int. Cl.
| | |
|---|---|
| *H04M 1/24* | (2006.01) |
| *H04M 3/08* | (2006.01) |
| *H04M 3/22* | (2006.01) |
| *H04B 3/32* | (2006.01) |
| *H04B 3/46* | (2006.01) |

(52) U.S. Cl.
CPC . *H04B 3/32* (2013.01); *H04B 3/464* (2013.01)
USPC .............. 379/32.04; 379/1.04; 379/22.08

(58) Field of Classification Search
USPC ......... 379/1.01, 1.04, 9, 10.01, 12, 15.01, 22, 379/22.02, 22.08, 23, 27.01, 28, 32.01, 379/32.04
See application file for complete search history.

(56) References Cited

U.S. PATENT DOCUMENTS

| | | | | |
|---|---|---|---|---|
| 6,061,427 | A | 5/2000 | Ryoo | |
| 7,330,516 | B2 * | 2/2008 | Cendrillon et al. | 375/295 |
| 8,073,135 | B2 * | 12/2011 | Rhee et al. | 379/417 |
| 8,081,752 | B2 * | 12/2011 | Du | 379/406.06 |
| 8,724,800 | B2 * | 5/2014 | Lu et al. | 379/417 |

(Continued)

FOREIGN PATENT DOCUMENTS

| | | | |
|---|---|---|---|
| CN | 1210399 A | 3/1999 | |
| CN | 1535513 A | 10/2004 | |

(Continued)

OTHER PUBLICATIONS

"Draft Revision of Recommendation ITU-T G.993.2 (for Consent)," International Telecommunication Union, Study Group 15, TD 466 R1 (PLEN/15), Telecommunication Standardization Sector, Sep. 16, 2011, 391 pages.

(Continued)

*Primary Examiner* — Binh Tieu
(74) *Attorney, Agent, or Firm* — Slater & Matsil L.L.P.

(57) ABSTRACT

The present invention provides a method, an apparatus, and a system for reducing digital subscriber line interference. The method includes identifying at least one legacy digital subscriber line in a digital subscriber line DSL legacy line set, obtaining a target power spectral density mask value of the legacy digital subscriber line, and reducing power spectral density of a transmit signal on the legacy digital subscriber line according to the target power spectral density mask value.

20 Claims, 14 Drawing Sheets

(56) References Cited

U.S. PATENT DOCUMENTS

| | | | |
|---|---|---|---|
| 8,848,555 B2* | 9/2014 | Lindqvist et al. ............. 370/252 |
| 2005/0152385 A1 | 7/2005 | Cioffi |
| 2006/0062288 A1 | 3/2006 | Hester |
| 2006/0114977 A1* | 6/2006 | Ginis et al. .................... 375/222 |
| 2006/0274893 A1 | 12/2006 | Cioffi et al. |
| 2006/0280237 A1* | 12/2006 | Rhee et al. .................... 375/222 |
| 2007/0274404 A1* | 11/2007 | Papandriopoulos et al. . 375/260 |
| 2009/0046568 A1 | 2/2009 | Xu |
| 2010/0027601 A1 | 2/2010 | Fang |
| 2011/0286503 A1* | 11/2011 | Cioffi et al. ................... 375/220 |
| 2012/0020418 A1* | 1/2012 | Sands et al. ................... 375/259 |
| 2012/0027060 A1* | 2/2012 | Singh et al. ................... 375/222 |
| 2012/0257691 A1 | 10/2012 | Ginis et al. |
| 2014/0233722 A1* | 8/2014 | Cendrillon et al. ...... 379/406.01 |

FOREIGN PATENT DOCUMENTS

| | | |
|---|---|---|
| CN | 1954586 A | 4/2007 |
| CN | 101399575 A | 4/2009 |
| WO | 2009152188 A2 | 12/2009 |
| WO | 2010081868 A2 | 7/2010 |

OTHER PUBLICATIONS

Series G: Transmission Systems and Media, Digital Systems and Networks, Digital sections and digital line system—Access networks; Asymmetric digital subscriber line transceivers 2 (ADSL2)—Extended bandwidth (ADSL2plus), ITU-T, G.992.5, Jan. 2009, 110 pages.

* cited by examiner

METHOD, APPARATUS, AND SYSTEM FOR REDUCING DIGITAL SUBSCRIBER LINE INTERFERENCE

This application is a continuation of International Application No. PCT/CN2011/081715, filed on Nov. 3, 2011, which is hereby incorporated by reference in its entirety.

TECHNICAL FIELD

The present invention relates to the communications field and, in particular embodiments, to a method, an apparatus, and a system for reducing digital subscriber line interference.

BACKGROUND

A digital subscriber line (DSL) technology is a high-speed transmission technology for performing data transmission by using a telephone twisted pair, that is, an unshielded twisted pair (UTP), and includes asymmetric digital subscriber line (ADSL), very-high-bit-rate digital subscriber line (VDSL), integrated services digital network (ISDN) digital subscriber line (IDSL), and the like. These digital subscriber lines are collectively referred to as xDSL.

Except baseband transmission DSLs such as IDSL and symmetric high-bit-rate digital subscriber line (SHDSL), a passband transmission xDSL enables, by using a frequency division multiplexing technology, an xDSL service to coexist on the same twisted pair as a plain old telephone service (POTS), where the xDSL service occupies a high frequency band, the POTS occupies a baseband part below 4 kilohertz (KHz), and a POTS signal and an xDSL signal are split by using a splitter. The passband transmission xDSL uses discrete multi-tone (DMT) modulation. A system providing access to multiple xDSLs is referred to as a digital subscriber line access multiplexer (DSLAM). According to the electromagnetic induction principle, mutual interference is caused among multiple channels of signals received by the DSLAM, which is referred to as crosstalk and includes near end crosstalk (NEXT) and far end crosstalk (FEXT). NEXT and FEXT energy increases as a frequency band increases. On one hand, because frequency division multiplexing is used for xDSL upstream and downstream channels, NEXT does not cause serious harm on system performance. On the other hand, because a frequency band used by the xDSL becomes wider, FEXT affects transmission performance of a line more seriously. According to Shannon's equation $C=B \cdot \log_2(1+S/N)$ (where C is a channel capacity, B is a signal bandwidth, S is signal energy, and N is noise energy), because crosstalk in an xDSL reflects a part of noises, serious FEXT significantly reduces a channel rate. When an xDSL service is provisioned in a bundle of cables upon the requests of multiple subscribers, FEXT may cause a low rate, unstable performance, and even a failure in service provisioning for some lines, which eventually results in a low line activation ratio of the DSLAM.

Currently, a technology known as a vectored digital subscriber line (Vectored-DSL) is proposed in the industry. The Vectored-DSL mainly uses a possibility of joint sending and receiving on a DSLAM end to cancel FEXT interference by using a signal processing method, thereby eventually eliminating FEXT interference in each channel of signals. As shown in FIG. 1a and FIG. 1b which respectively provide a schematic diagram of synchronous sending and synchronous receiving on a DSLAM end, an operating principle thereof is described as follows:

In FIG. 1a and FIG. 1b, a shared channel H on a $k^{th}$ tone of a frequency domain may be expressed in a matrix form:

$$H = \begin{bmatrix} h_{11} & h_{12} & \cdots & h_{1M} \\ h_{21} & h_{22} & \cdots & h_{2M} \\ & & h_{ij} & \\ \vdots & \vdots & \ddots & \vdots \\ h_{M1} & h_{M2} & \cdots & h_{MM} \end{bmatrix}_{M \times M} \quad \text{(equation 1)}$$

In equation 1, $h_{ij}$ is a transmission equation from a line pair j to a line pair i. Actually, i equals j and equals the number of channels having a crosstalk relationship with each other in a shared channel. On an assumption that the number of channels having a crosstalk relationship with each other in a shared channel is M, H is an M×M channel transmission matrix. Moreover, it is respectively assumed that x is an M×1 channel input vector, y is an M×1 channel output vector, and n is an M×1 noise vector. Eventually, the channel transmission equation is expressed in the following form:

$$y = Hx + n \quad \text{(equation 1)}$$

In an upstream direction, joint receiving processing on a signal is performed on a central office (CO) end. That is, a crosstalk canceller (expressed by using a matrix W) is added to a vectored digital subscriber line access multiplexer (Vectored DSLAM; refer to FIG. 1c for functional modules thereof) on the CO end, and therefore a signal received by the CO end is:

$$\tilde{y} = Wy = WHx + Wn \quad \text{(equation 2)}$$

When a matrix WH is a diagonal matrix, the crosstalk is eliminated.

In a downstream direction, joint sending processing on a signal is performed on the CO end. That is, a crosstalk precoder (expressed by using a matrix P) is added to the Vectored DSLAM on the CO end, and therefore a signal sent by the CO end is:

$$\tilde{x} = Px \quad \text{(equation 3)}$$

A signal received by a receiving end (subscriber end) is:

$$\tilde{y} = H\tilde{x} + n = HPx + n \quad \text{(equation 4)}$$

When a matrix HP is a diagonal matrix, the crosstalk is also eliminated.

According to the above analysis, a Vectored-DSL performs joint processing in the upstream and downstream directions to achieve an effect of eliminating far end crosstalk, where a key point thereof is to estimate a downstream precoding matrix P and an upstream cancellation matrix W.

Generally, a Vectored-DSL system is implemented by using the following method. Firstly, synchronization is performed using a synchronization symbol (Sync Symbol. Then, joint modulation is performed on a pilot sequence on Sync Symbols of all lines. Finally, a receiving side feeds back an error to a vectoring control entity (VCE). Hence, a downstream precoding matrix P and an upstream cancellation matrix W may be estimated in the VCE, thereby canceling FEXT by using the vectoring technology described above.

A VDSL2 technology is prior to the Vectored-DSL technology and has been widely applied; therefore, compatibility with an existing VDSL2 legacy (Legacy) customer premises equipment (CPE), that is, a VDSL2 Legacy CPE, on an existing network must be considered when upgrading a VDSL2 to a Vectored-DSL. However, the VDSL2 Legacy CPE does not support pilot sequence sending and receiving or error feedback on a synchronization symbol.

In order to support pilot sequence sending and receiving and error feedback on a synchronization symbol (Sync Symbol) to estimate a downstream precoding matrix P and an upstream cancellation matrix W, a method provided by the prior art is to upgrade all VDSL2 Legacy CPEs on an existing VDSL2 network to or replace them with VDSL2 Vectored CPEs.

SUMMARY OF THE INVENTION

The inventor of the present application finds that the prior art has at least the following shortcomings.

First, the cost is high. On one hand, a high cost needs to be consumed to upgrade all VDSL2 Legacy CPEs on an existing network. On the other hand, it is possible that some obsolete VDSL2 Legacy CPEs cannot be upgraded to vectored (Vector) CPEs due to various reasons such as inability to support error calculation, error feedback, and pilot sequence sending in an upstream direction, and therefore the entire CPE needs to be replaced, which further increases the cost.

Second, an upgrade requires a long period of time to complete. Because an existing network has many VDSL2 Legacy CPEs, the upgrade cannot be completed overnight. Moreover, various factors, for example, a subscriber is not at home, may still result in a situation in which Vectored CPEs and VDSL2 Legacy CPEs coexist for a long period of time.

Embodiments of the present invention provide a method, an apparatus, and a system for reducing digital subscriber line interference, so as to reduce, as much as possible, or eliminate an influence of a legacy line on a vectored line in a digital subscriber line system.

An embodiment of the present invention provides a method for reducing digital subscriber line interference. At least one legacy digital subscriber line in a digital subscriber line set is identified. The digital subscriber line set includes at least one vectored digital subscriber line and the legacy digital subscriber line. A target power spectral density mask value of the legacy digital subscriber line is obtained. The target power spectral density mask value is a reference value for reducing interference of the legacy digital subscriber line on the vectored digital subscriber line. Power spectral density of a transmit signal on the legacy digital subscriber line is maintained according to the target power spectral density mask value.

An embodiment of the present invention provides a method for reducing digital subscriber line interference. At least one legacy digital subscriber line in a digital subscriber line set is identified. The digital subscriber line set includes at least one vectored digital subscriber line and the legacy digital subscriber line. A target power spectral density mask value or a maximum transmit frequency limit value of the legacy digital subscriber line is obtained. The target power spectral density mask value is a reference value for reducing interference of the legacy digital subscriber line on the vectored digital subscriber line. A port template parameter is configured according to the target power spectral density mask value or the maximum transmit frequency limit value to reduce interference of the legacy digital subscriber line on the vectored digital subscriber line.

An embodiment of the present invention provides an apparatus for reducing digital subscriber line interference. The apparatus is a central office transceiver unit in a digital subscriber line system. An identifying module is configured to identify at least one legacy digital subscriber line in a digital subscriber line set. The digital subscriber line set includes at least one vectored digital subscriber line and the legacy digital subscriber line. An obtaining module is configured to obtain a target power spectral density mask value of the legacy digital subscriber line. The target power spectral density mask value is a reference value for reducing interference of the legacy digital subscriber line on the vectored digital subscriber line. A reducing module is configured to reduce power spectral density of a transmit signal on the legacy digital subscriber line according to the target power spectral density mask value.

An embodiment of the present invention provides an apparatus for reducing digital subscriber line interference. A line identifying module is configured to identify at least one legacy digital subscriber line in a digital subscriber line set. The digital subscriber line set includes at least one vectored digital subscriber line and the legacy digital subscriber line. A reference value obtaining module is configured to obtain a target power spectral density mask value or a maximum transmit frequency limit value of the legacy digital subscriber line. The target power spectral density mask value is a reference value for reducing interference of the legacy digital subscriber line on the vectored digital subscriber line. A configuring module is configured to configure a port template parameter according to the target power spectral density mask value or the maximum transmit frequency limit value to reduce interference of the legacy digital subscriber line on the vectored digital subscriber line.

An embodiment of the present invention provides a system for reducing digital subscriber line interference. The system includes a digital subscriber line access multiplexer, at least one vectored digital subscriber line, at least one legacy digital subscriber line, at least one vectored customer premises equipment, and at least one legacy customer premises equipment. The digital subscriber line access multiplexer includes a central office transceiver unit in a vectored digital subscriber line system. The at least one vectored digital subscriber line is configured to connect the at least one vectored customer premises equipment to the central office transceiver unit in the vectored digital subscriber line system. The at least one legacy digital subscriber line is configured to connect the at least one legacy customer premises equipment to the central office transceiver unit in the vectored digital subscriber line system. The at least one vectored customer premises equipment is configured to interact with the central office transceiver unit in the vectored digital subscriber line system by using the at least one vectored digital subscriber line. The at least one legacy customer premises equipment is configured to interact with the central office transceiver unit in the vectored digital subscriber line system by using the at least one legacy digital subscriber line. The central office transceiver unit in the vectored digital subscriber line system is configured to identify the at least one legacy digital subscriber line in a digital subscriber line set, obtain a target power spectral density mask value of the legacy digital subscriber line, and reduce power spectral density of a transmit signal on the at least one legacy digital subscriber line according to the target power spectral density mask value.

According to the foregoing embodiments of the present invention, after at least one legacy digital subscriber line in a digital subscriber line set is identified, power spectral density of a transmit signal on the legacy digital subscriber line can be reduced according to an obtained target power spectral density mask value. Therefore, compared with the method, which is provided by the prior art, of completely upgrading all VDSL2 Legacy CPEs in an existing VDSL2 network to or replacing them with VDSL2 Vectored CPEs, the method according to the embodiments of the present invention can achieve an effect of eliminating far end crosstalk caused on a Vectored DSL line without upgrading or replacing the VDSL2 Legacy CPEs, thereby reducing time consumed by the upgrade, and eliminating human and material (such as device) costs caused by the upgrade.

BRIEF DESCRIPTION OF THE DRAWINGS

To describe the technical solutions in the embodiments of the present invention more clearly, the following briefly introduces the accompanying drawings required for describing the prior art or the embodiments. Apparently, the accompanying drawings in the following description show merely some embodiments of the present invention, and a person of ordinary skill in the art may still derive other drawings from these accompanying drawings without creative efforts.

DETAILED DESCRIPTION OF ILLUSTRATIVE EMBODIMENTS

Embodiments of the present invention provide a method, an apparatus, and a system for reducing digital subscriber line interference, so as to reduce, as much as possible, or eliminate an influence of a legacy digital subscriber line on a vectored line in a digital subscriber line system.

The following clearly describes the technical solutions in the embodiments of the present invention with reference to the accompanying drawings in the embodiments of the present invention. Apparently, the described embodiments are merely a part rather than all of the embodiments of the present invention. All other embodiments obtained by a person of ordinary skill in the art based on the embodiments of the present invention without creative efforts shall fall within the protection scope of the present invention.

Figure 1A:
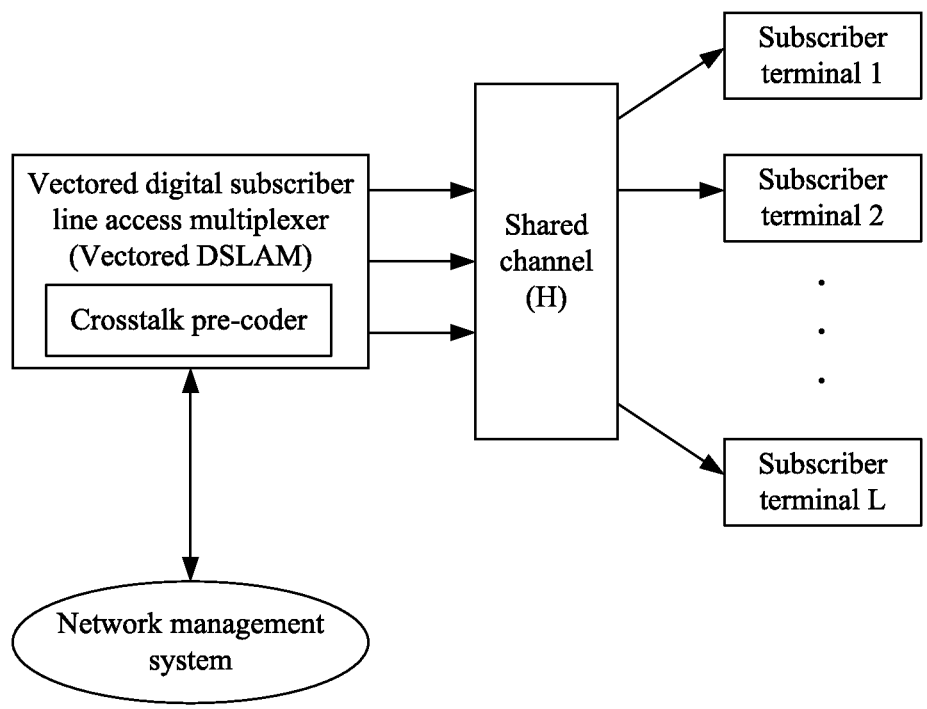
FIG. 1a is a schematic diagram illustrating joint sending on a DSLAM end and separate receiving on a subscriber end on a DSL according to a widely-known technology.
Figure 1B:
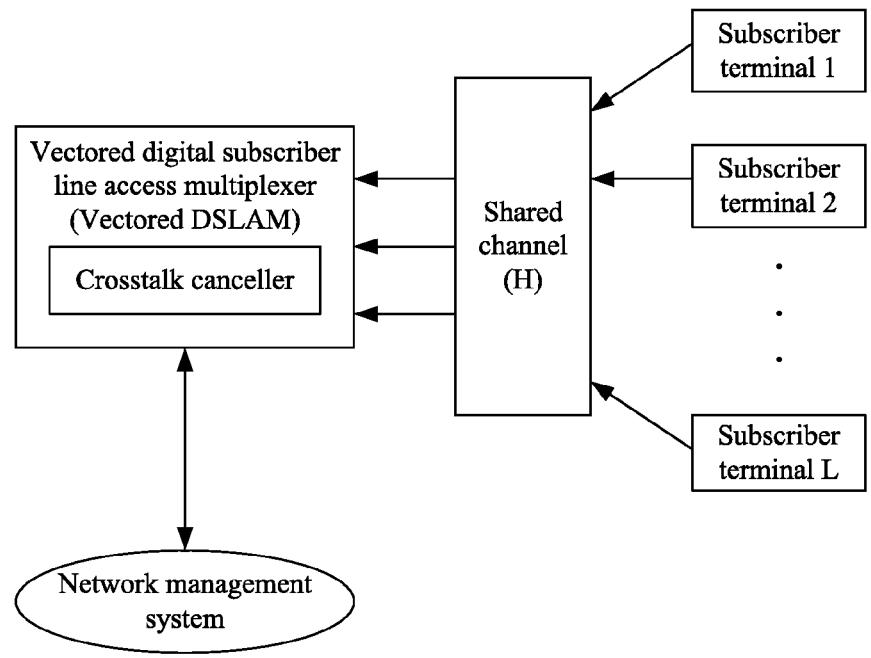
FIG. 1b is a schematic diagram illustrating separate sending on a subscriber end and joint receiving on a DSLAM end on a DSL according to a widely-known technology.
Figure 1C:
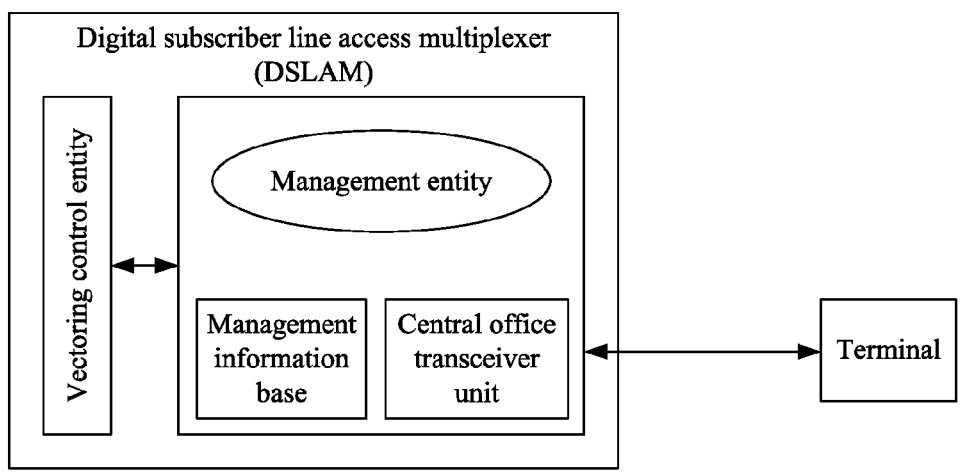
FIG. 1c is a schematic structural diagram of a vectored digital subscriber line access multiplexer according to a widely-known technology.
Figure 2:
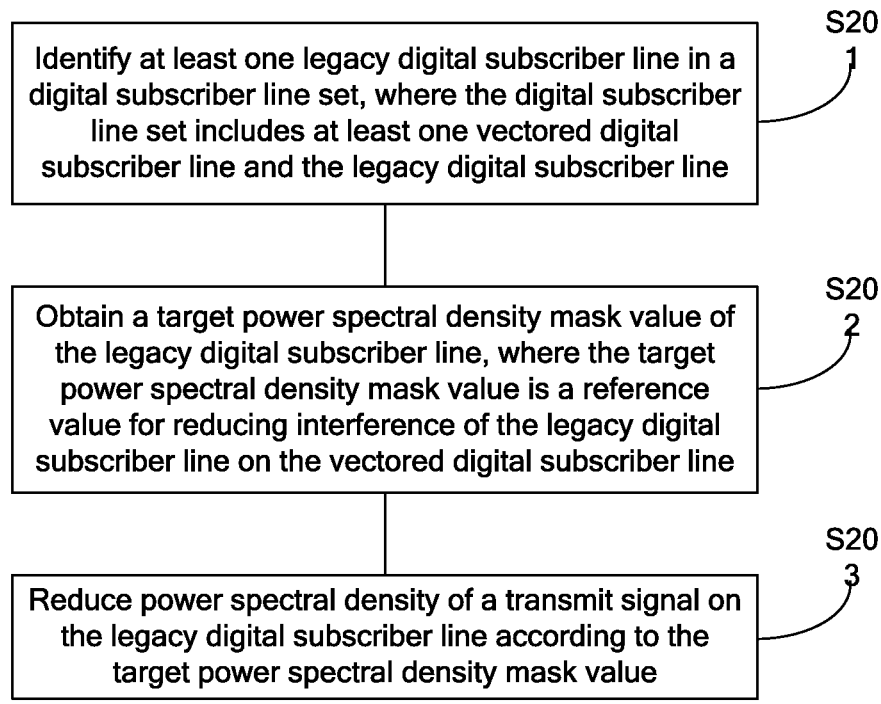
FIG. 2 is a schematic flowchart of a method for reducing digital subscriber line interference according to an embodiment of the present invention.

Refer to FIG. 2 which is a schematic flowchart of a method for reducing digital subscriber line interference according to an embodiment of the present invention. In the method illustrated in FIG. 2, an entity for performing steps may be a central office device in a Vectored-DSL system, for example, a transceiver unit at central office (VTU-O, VDSL2 Transceiver Unit at the central office). The method for reducing digital subscriber line interference illustrated in FIG. 2 mainly includes the following steps.

S201: Identify at least one legacy digital subscriber line in a digital subscriber line set.

In this embodiment of the present invention, the digital subscriber line set is a set which includes at least one vectored (Vector) digital subscriber line and may include a legacy digital subscriber line. The legacy digital subscriber line is in contrast to the vectored digital subscriber line in a Vectored-DSL system, and may be, in this embodiment of the present invention, a line connecting a VTU-O to a VDSL2 customer premises equipment (CPE) that does not support a Vectored-DSL. If power (including upstream power and downstream power) of this type of lines is not limited, the vectored digital subscriber line in the Vectored-DSL system may be affected, for example, by far end crosstalk. Therefore, in order to prevent the legacy digital subscriber line from interfering with the vectored digital subscriber line, the legacy digital subscriber line that may exist in the digital subscriber line set needs to be identified first.

In an embodiment of the present invention, when identifying at least one legacy digital subscriber line in a digital subscriber line set, a VTU-O may, in a phase of handshaking between the VTU-O and a transceiver unit the Remote site (VDSL2 Transceiver Unit at the Remote site, VTU-R) on a vectored digital subscriber line, interact with the VTU-R in a CPE (where the VTU-R is a functional unit in the CPE) to obtain a capability set of the CPE; if the VTU-O learns, according to the interaction between the VTU-O and the VTU-R, that a CPE connected to at least one digital subscriber line does not support a vectored (Vector) capability set, the VTU-O identifies the at least one digital subscriber line connected to the CPE as a legacy digital subscriber line.

S202: Obtain a target power spectral density mask value of the legacy digital subscriber line.

The target power spectral density mask value is a reference value for reducing interference of the legacy digital subscriber line on a vectored digital subscriber line, and includes an upstream target power spectral density mask value and a downstream target power spectral density mask value. It is a transmit power spectral density (TxPSD) mask value which ensures that an upstream signal or a downstream signal that is transmitted on the legacy digital subscriber line does not cause far end crosstalk on the vectored digital subscriber line after transmit power (including upstream power and downstream power) on the legacy digital subscriber line is confined or reduced.

In one embodiment of the present invention, a target power spectral density mask value of a legacy digital subscriber line may be estimated according to a digital subscriber line interference model.

For example, according to the digital subscriber line interference model, power of an actually measured strongest-crosstalk attenuation value is around −55 dB generally; if noise power spectral density causing crosstalk on a vectored digital subscriber line is at a level of −135 dBm/Hz, that is, at a level that is equivalent to a background noise, the vectored digital subscriber line is not affected. Therefore, according to the equation, that is a power spectral density mask value of a crosstalk signal=a target power spectral density mask value of a legacy digital subscriber line+a crosstalk attenuation value, the target power spectral density mask value of the legacy digital subscriber line may be estimated to be −80 dBm/Hz without loss of generality. The target power spectral density mask value of the legacy digital subscriber line may also be estimated to be within a range from −75 dBm/Hz to −85 dBm/Hz.

In another embodiment of the present invention, a target power spectral density mask value of a legacy digital subscriber line may be calculated by obtaining a channel parameter of the legacy digital subscriber line. The channel parameter of the legacy digital subscriber line includes channel attenuation (that is, a logarithmic value of channel attenuation, hereinafter expressed by using Hlog), a quiet line noise (QLN), a signal-to-noise ratio margin, a bit allocation table ($b_n$), and a target rate (hereinafter expressed by using TargetRate), and the like. Generally, a rate of a legacy digital subscriber line is low. According to the Shannon's capacity equation:

$$TargetRate = \sum_{n=1}^{N} b_n = \sum_{n=1}^{N} \log_2\left(1 + \frac{10^{\frac{SNR(n)}{10}}}{\Gamma}\right),$$

where n is a serial number of an available tone, N is a maximum serial number of a tone, $\Gamma$ is a difference obtained after a coding gain is subtracted from a sum of a signal-to-noise ratio gap (fixed value) and a signal-to-noise ratio margin.

SNR(n)=TxPSD(n)+H log(n)−QLN(n), and TxPSD(n) is calculated and used as the target power spectral density mask value of the legacy digital subscriber line.

S203: Reduce power spectral density of a transmit signal on the legacy digital subscriber line according to the target power spectral density mask value.

According to the foregoing embodiment of the present invention, after at least one legacy digital subscriber line in a digital subscriber line set is identified, power spectral density of a transmit signal on the legacy digital subscriber line can be reduced according to an obtained target power spectral density mask value. Therefore, compared with the method, which is provided by the prior art, of completely upgrading all VDSL2 Legacy CPEs in an existing VDSL2 network to or replacing them with VDSL2 Vectored CPEs, the method according to this embodiment of the present invention can achieve an effect of eliminating far end crosstalk caused on a Vectored DSL line without upgrading or replacing the VDSL2 Legacy CPEs, thereby reducing time consumed by the upgrade, and eliminating human and material (such as device) costs caused by the upgrade.

In one embodiment of the present invention, power spectral density of a transmit signal on a legacy digital subscriber line may be reduced according to an upstream target power spectral density mask value (expressed by using "Cutting PSDMASKus" herein for the convenience of description) or a downstream target power spectral density mask value (expressed by using "Cutting PSDMASKds" for the convenience of description).

Further, the reducing the power spectral density of the transmit signal on the legacy digital subscriber line according to the upstream target power spectral density mask value specifically includes the following:

S11: Use a smaller value between an upstream power spectral density mask value that is obtained last time or during initialization and the upstream target power spectral density mask value to obtain a current upstream power spectral density mask value.

For the convenience of description, the upstream power spectral density mask value is expressed by using "PSDMSKus". During initialization, the upstream power spectral density mask value has one initialized value. The upstream power spectral density mask value that is obtained last time or during the initialization may be compared with the upstream target power spectral density mask value, and the smaller value thereof is used as the current upstream power spectral density mask value (the current upstream power spectral density mask value is expressed by using "current_PSDMSKus" herein for the convenience of description), that is, current_PSDMASKus(f)=min [PSDMASKus(f), Cutting PSDMASKus(f)], where "min" indicates that a minimum value is used, a frequency is not an element of RFIBANDS (f∉RFIBANDS), and RFIBANDS refers to a set of radio frequency interference frequency bands.

S12: Send the current upstream power spectral density mask value to a terminal in a digital subscriber line system, so that the terminal reduces, when confining channel discovery phase power spectral density (Channel Discovery Power Spectral Density, CDPSD) to be not more than the smallest value in values obtained by subtracting 3.5 dB separately from an upstream maximum mask value during a start phase of a channel discovery phase, an upstream power back-off mask value, and the current upstream power spectral density mask value, power spectral density of an upstream signal on the legacy digital subscriber line.

At the start of the channel discovery phase, the terminal compares, upon receiving the current upstream power spectral density mask value, the values obtained by subtracting 3.5 dB separately from the upstream maximum mask value at the start of the channel discovery phase (Channel Discovery maximum mask, CDMAXMASKus), the upstream power back-off mask value (UPBOMASK), and the current upstream power spectral density mask value, and confines the channel discovery power spectral density to be not more than the smaller value in the values obtained by subtracting 3.5 dB separately from the upstream maximum mask value at the start of the channel discovery phase, the upstream power back-off mask value, and the current upstream power spectral density mask value. Specifically, an upstream power spectral density value at the start of the channel discovery phase (expressed by using "CDPSDus") is confined to be not more than the smaller value in the values obtained by subtracting 3.5 dB separately from the upstream maximum mask value at the start of the channel discovery phase, the upstream power back-off mask value, and the current upstream power spectral density mask value, that is, CDPSDus(f)≤min[(current_PSDMASKus(f)−3.5),(CDMAXMASKus−3.5),(UPBOMASK($kl_0$,f)−3.5)], f∉RFIBANDS where RFIBANDS refers to a set of radio frequency interference frequency bands.

In another embodiment of the present invention, the reducing the power spectral density of the transmit signal on the legacy digital subscriber line according to the target power spectral density mask value specifically includes the following:

S'11: Use a smaller value between a downstream power spectral density mask value that is obtained last time or during initialization and the downstream target power spectral density mask value to obtain a current downstream power spectral density mask value.

The downstream power spectral density mask value is expressed by using "PSDMSKds". During initialization, the downstream power spectral density mask value has one initialized value. The downstream power spectral density mask value that is obtained last time or during the initialization may be compared with the downstream target power spectral density mask value, and the smaller value thereof is used as the current downstream power spectral density mask value (the current downstream power spectral density mask value is expressed by using "current_PSDMSKds" herein for the convenience of description), that is, current_PSDMASKds(f) =min [PSDMASKds(f),Cutting PSDMASKds(f)], where "min" indicates that a minimum value is used, a frequency is not an element of RFIBANDS (f∉RFIBANDS), and RFIBANDS refers to a set of radio frequency interference frequency bands.

S'12: Obtain a difference between a smaller value, between a downstream maximum mask value during a start phase of a channel discovery phase and the current downstream power spectral density mask value, and 3.5 dB.

In this embodiment, the downstream maximum mask value at the start of the channel discovery phase may be a preset value.

S'13: When a channel discovery power spectral density is confined to be not more than the difference, reduce power spectral density of a downstream signal on the legacy digital subscriber line.

Downstream power is determined by a central office device, for example, a VTU-O. Therefore, reduction of the downstream power is completed on the central office device. Specifically, downstream power spectral density at the start of the channel discovery phase (expressed by using "CDPSDds") is confined to be not more than the smaller value between the values obtained by subtracting 3.5 dB separately from the downstream maximum mask value at the start of the channel discovery phase and the current downstream power spectral density mask value, that is, cDPSDds(f)≤min[(current_PSDMASKds(f)−3.5),(CDMAXMASKds−3.5)], f∉RFIBANDS, where RFIBANDS refers to a set of radio frequency interference frequency bands, thereby reducing power spectral density of a downstream signal on the legacy digital subscriber line.

At an end of the channel discovery phase, the central office device, for example, the VTU-O, may reduce the downstream power according to the downstream maximum mask value (expressed by using "MAXMASKds") and the current downstream power spectral density mask value to obtain a downstream reference power spectral density mask value (MEDLEY reference PSD mask, MREFMASKds) during a training phase, that is, MREFMASKds(f)=min(current_PSDMASKds(f), MAXMASKds), f∉RFIBANDS, where "min" indicates that a minimum value is used, and RFIBANDS refers to a set of radio frequency interference frequency bands.

At the end of the channel discovery phase, the terminal (for example, a VTU-R) may reduce upstream power according to the upstream maximum mask value (expressed by using "MAXMASKus"), the upstream power back-off mask value (UPBOMASK), and the current upstream power spectral density mask value to obtain an upstream reference power spectral density mask value (MEDLEY reference PSD mask, MREFMASKus) during the training phase, that is, MREFMASKds(f)=min(current_PSDMASKus(f), MAXMASKus, UPBOMASK($kl_0$, f)), f∉RFIBANDS, where "min" indicates that a minimum value is used, and RFIBANDS refers to a set of radio frequency interference frequency bands.

In another embodiment of the present invention, the reducing the power spectral density of the transmit signal on the legacy digital subscriber line according to the target power spectral density mask value specifically includes the following:

S21: Use a smaller value between a downstream maximum mask value during a start phase of a channel discovery phase that is obtained last time or during initialization and a reduced downstream target power spectral density limit value to obtain a current downstream maximum mask value at the start of the channel discovery phase.

During initialization, the downstream maximum mask value at the start of the channel discovery phase has one initialized value. If a value obtained by subtracting 3.5 dB from the initialized value of the downstream maximum mask value at the start of the channel discovery phase (CDMAXMASKds) is less than the downstream target power spectral density mask value, power reduction is not required. If the value obtained by subtracting 3.5 dB from the initialized value of the downstream maximum mask value at the start of the channel discovery phase (CDMAXMASKds) is greater than the downstream target power spectral density mask value, power reduction needs to be performed.

The downstream maximum mask value at the start of the channel discovery phase that is obtained last time or the initialized value of the downstream maximum mask value at the start of the channel discovery phase (CDMAXMASKds) may be compared with the downstream target power spectral density mask value, and a smaller one thereof is used as the current downstream maximum mask value at the start of the channel discovery phase (the current downstream maximum mask value at the start of the channel discovery phase is expressed by using "current_CDMAXMASKds" herein for the convenience of description), that is, current_CDAMX-MASKds(f)=min [CDMAXMASKds(f), Cutting PSD-MASKds(f)], where "min" indicates that a minimum value is used, a frequency is not an element of RFIBANDS (f∉RFIBANDS), and RFIBANDS is a set of radio frequency interference frequency bands.

S22: Obtain a difference between a smaller value, between a downstream power spectral density mask value and the current downstream maximum mask value at the start of the channel discovery phase, and 3.5 dB.

S23: When a channel discovery power spectral density is confined to be not more than the difference, reduce power spectral density of a downstream signal on the legacy digital subscriber line.

Downstream power is determined by a central office device, for example, a VTU-O. Therefore, reduction of the downstream power is completed on the central office device. Specifically, a downstream power spectral density value at the start of the channel discovery phase (expressed by using "CDPSDds") is confined to be not more than the smaller value between the values obtained by subtracting 3.5 dB separately from the downstream power spectral density mask value and the current downstream maximum mask value at the start of the channel discovery phase, that is, CDPSDds(f) ≤min[(PSDMASKds(f)−3.5),(current_CDMAXMASKds−3.5)], f∉RFIBANDS, thereby reducing power spectral density of a downstream signal on the legacy digital subscriber line.

In another embodiment of the present invention, the reducing the power spectral density of the transmit signal on the legacy digital subscriber line according to the upstream target power spectral density mask value specifically includes the following:

S'21: Use a smaller value between an upstream maximum mask value during a start phase of a channel discovery phase that is obtained last time or during initialization and the upstream target power spectral density mask value to obtain a current upstream target power spectral density mask value.

During initialization, the upstream maximum mask value at the start of the channel discovery phase has one initialized value. The upstream maximum mask value at the start of the channel discovery phase that is obtained last time or during the initialization may be compared with the upstream target power spectral density mask value, and a smaller value thereof is used as the current upstream target power spectral density mask value (where the current upstream target power spectral density mask value is expressed by using "current-_Cutting PSDMSKus" herein for the convenience of description), that is, current_Cutting PSDMASKus(f)=min [CD-MAXMASKus(f),Cutting PSDMASKus(f)], where "min" indicates that a minimum value is used, a frequency is not an element of RFIBANDS (f∉RFIBANDS), and RFIBANDS is a set of radio frequency interference frequency bands.

S'22: Send an upstream power back-off mask value and the current upstream target power spectral density mask value to a terminal in a digital subscriber line system, so that the terminal reduces, when confining channel discovery power spectral density to be not more than the smallest value in values obtained by subtracting 3.5 dB separately from the current upstream maximum mask value at the start of the channel discovery phase, the upstream power back-off mask value, and an upstream power spectral density mask value, power spectral density of an upstream signal on the legacy digital subscriber line.

At the start of the channel discovery phase, the terminal compares, upon receiving the upstream power back-off mask value and the current upstream maximum mask value at the start of the channel discovery phase, the values obtained by subtracting 3.5 dB separately from the current upstream maximum mask value at the start of the channel discovery phase (Channel Discovery maximum mask, CDMAX-MASKus), the upstream power back-off mask value (UPBO-MASK), and the upstream power spectral density mask value, and confines the channel discovery phase power spectral density (Channel Discovery PSD, CDPSD) to be not more than the smaller value in the values obtained by subtracting 3.5 dB separately from the current upstream maximum mask value at the start of the channel discovery phase, the upstream power back-off mask value, and the upstream power spectral density mask value. Specifically, an upstream power spectral density value at the start of the channel discovery phase (expressed by using "CDPSDus") is confined to be not more than the smaller value in the values obtained by subtracting 3.5 dB separately from the current upstream maximum mask value at the start of the channel discovery phase, the upstream power back-off mask value, and the upstream power spectral density mask value, that is, CDPSDus(f)≤min [(PSDMASKus(f)−3.5), (CDMAXMASKus−3.5), (UPBOMASK($kl_0$, f)−3.5)], f∉RFIBANDS, where RFIBANDS refers to a set of radio frequency interference frequency bands.

At an end of the channel discovery phase, the terminal, for example, a VTU-R, re-calculates a downstream maximum mask at the end of the channel discovery phase (where the downstream maximum mask at the end of the channel discovery phase is expressed by using "MAXMASKds"), and sends the MAXMSKds as a reference to a central office device, for example, a VTU-O. Then, the central office device performs reduction on downstream power, that is, current-_MAXMASKds(f)=min [MAXMASKds(f), Cutting PSD-MASKds(f)].

At the end of the channel discovery phase, a central office device, for example, a VTU-O, may also re-calculate an upstream maximum mask at the end of the channel discovery phase (where the upstream maximum mask at the end of the channel discovery phase is expressed by using "MAX-MASKus"), that is, current_MAXMASKus(f)=min [MAX-MASKus(f), Cutting PSDMASKus(f)], and sends the current_MAXMASKus(f) obtained by re-calculation as a reference to the terminal, for example, a VTU-R, and then the terminal performs reduction on upstream power.

Figure 3:
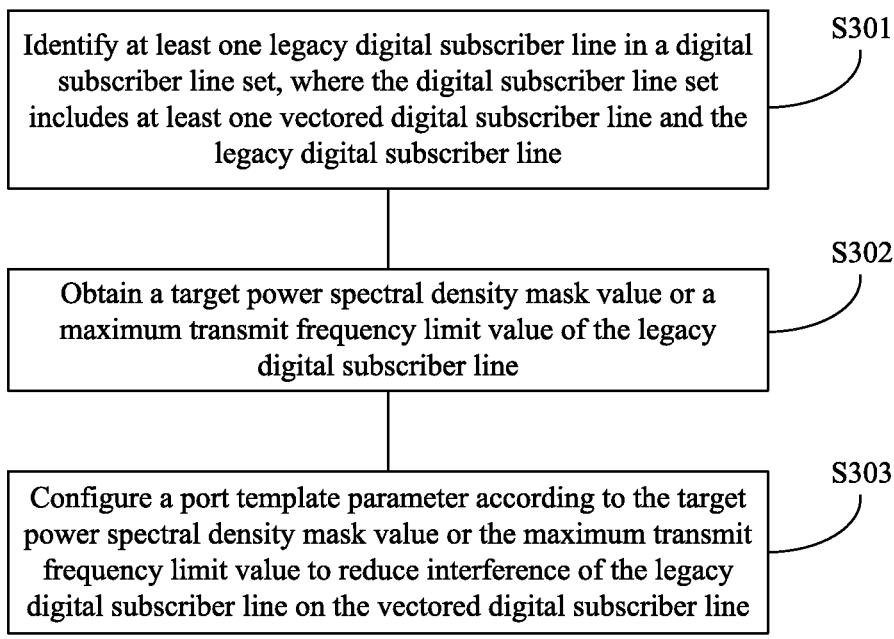
FIG. 3 is a schematic flowchart of a method for reducing digital subscriber line interference according to another embodiment of the present invention.

Refer to FIG. 3 which is a schematic flowchart of a method for reducing digital subscriber line interference according to another embodiment of the present invention. In the method illustrated in FIG. 3, an entity executing steps may be a vectoring control entity (VCE) in a Vectored-DSL system, and the method mainly includes the following steps:

S301: Identify at least one legacy digital subscriber line in a digital subscriber line set, where the digital subscriber line set includes at least one vectored digital subscriber line and the legacy digital subscriber line.

In one embodiment of the present invention for identifying at least one legacy digital subscriber line in a digital subscriber line set, the at least one legacy digital subscriber line in the digital subscriber line set may be identified by obtaining prior information. That is, a VCE identifies, by obtaining existing prior information of a carrier, such as a version and model of a terminal device or a historical record indicating whether the terminal device is a vectored terminal (the prior information is stored in a database or storing unit of the VCE or is separate from the database or storing unit of the VCE), whether at least one digital subscriber line in the digital subscriber line set is a legacy digital subscriber line.

S302: Obtain a target power spectral density mask value or a maximum transmit frequency limit value of the legacy digital subscriber line.

The target power spectral density mask value of the legacy digital subscriber line may be obtained in one of the following manners.

Manner 1: Estimate the target power spectral density mask value of the legacy digital subscriber line according to a digital subscriber line interference model.

As described above, according to the digital subscriber line interference model, power of an actually measured strongest-crosstalk attenuation value is around −55 dB generally; if a noise power spectral density causing crosstalk on the vectored digital subscriber line is at a level of −135 dBm/Hz, that is, at a level that is equivalent to a background noise, the vectored digital subscriber line is not affected. Therefore, according to the equation, that is a power spectral density mask value of a crosstalk signal=a target power spectral density mask value of a legacy digital subscriber line+a crosstalk attenuation value, the target power spectral density mask value of the legacy digital subscriber line may be estimated to be −80 dBm/Hz without loss of generality. The target power spectral density mask value of the legacy digital subscriber line may also be estimated to be within a range from −75 dBm/Hz to −85 dBm/Hz.

Manner 2: Calculate the target power spectral density mask value of the legacy digital subscriber line by obtaining a historical channel parameter of the legacy digital subscriber line.

The historical channel parameter of the legacy digital subscriber line includes channel attenuation (that is, a logarithmic value of channel attenuation, hereinafter expressed by using Hlog), a quiet line noise (QLN), a signal-to-noise ratio margin, a bit allocation table ($b_n$), and a target rate (hereinafter expressed by using TargetRate), and the like, which are stored before. Generally, a rate of a legacy digital subscriber line is low. According to the Shannon's capacity equation:

$$TargetRate = \sum_{n=1}^{N} b_n = \sum_{n=1}^{N} \log_2\left(1 + \frac{10^{\frac{SNR(n)}{10}}}{\Gamma}\right),$$

where n is a serial number of an available tone, N is a maximum serial number of a tone, $\Gamma$ is a difference obtained after a coding gain is subtracted from a sum of a signal-to-noise ratio gap (fixed value) and a signal-to-noise ratio margin.

SNR(n)=TxPSD(n)+H log(n)−QLN(n), and TxPSD(n) is calculated and used as the target power spectral density mask value of the legacy digital subscriber line.

The maximum transmit frequency limit value of the legacy digital subscriber line may be obtained in one of the following manners.

Manner 1: Estimate the maximum transmit frequency limit value of the legacy digital subscriber line according to a digital subscriber line interference model.

According to the digital subscriber line interference model, an operating frequency band of an ADSL ranges from 0 to 1.1 MHz, an operating frequency band of an ADSL2+ ranges from 0 to 2.2 MHz, and an operating frequency band of both a VDSL2 and a Vectored-DSL ranges from 0 to 30 MHz. The ADSL and ADSL2+ operate on lower frequency bands, which have smaller crosstalk, and the frequency bands in use are much less than the operating frequency band of the Vectored-DSL. Therefore, crosstalk influence of the ADSL and ADSL2+ on the Vectored-DSL is very small. According to actual measurements, within a line length range of 1000 m, a legacy digital subscriber line may achieve a rate of 10 Mbps when operating on the frequency band from 0 to 1.1 MHz, and may achieve a rate of around 20 Mbps when operating on the frequency band from 0 to 2.2 MHz. At present, most legacy digital subscriber lines are required to have a rate within a range of 20 Mbps. Therefore, the maximum transmit frequency limit value, for example, 2.2 MHz, of the legacy digital subscriber line may be estimated according to the digital subscriber line interference model.

Manner 2: Calculate the maximum transmit frequency limit value of the legacy digital subscriber line by obtaining a historical channel parameter of the legacy digital subscriber line.

A VCE obtains the historical channel parameter, including a signal-to-noise ratio (SNR), a bit allocation table ($b_n$), and a target rate (TargetRate), and the like. Generally, a rate of a legacy digital subscriber line is low. According to the Shannon's capacity equation:

$$TargetRate = \sum_{n=1}^{N} b_n = \sum_{n=1}^{N} \log_2\left(1 + \frac{10^{\frac{SNR(n)}{10}}}{\Gamma}\right),$$

where n is a serial number of an available tone.

A maximum serial number of a tone, N, required by the legacy digital subscriber line is calculated. Hence, the maximum transmit frequency limit value of the legacy digital subscriber line=the maximum serial number of the tone N×a tone width.

S303: Configure a port template parameter according to the target power spectral density mask value or the maximum transmit frequency limit value to reduce interference of the legacy digital subscriber line on the vectored digital subscriber line.

An embodiment for configuring a port template parameter according to a target power spectral density mask value to reduce interference of a legacy digital subscriber line on a vectored digital subscriber line may be performed in any one of the following manners.

Manner 1: Configure the target power spectral density mask value, and use the configured target power spectral density mask value as an upstream and/or a downstream power spectral density mask value in a management information base (MIB). More specifically, an upstream target power spectral density mask value is configured and the configured upstream target power spectral density mask value is used as an upstream power spectral density mask value in the MIB. A downstream target power spectral density mask value is configured and the configured downstream target power spectral density mask value is used as a downstream power spectral density mask value in the MIB. Alternatively, an upstream target power spectral density mask value is configured and the configured upstream target power spectral density mask value is used as an upstream power spectral density mask value in the MIB and a downstream target power spectral density mask value is configured and the configured downstream target power spectral density mask value is used as a downstream power spectral density mask value in the MIB.

Manner 2: Configure an average value, a maximum value, or a minimum value of the target power spectral density mask value, and use the configured average value, maximum value, or minimum value of the target power spectral density mask value as upstream or downstream maximum normal power spectral density in a management information base. More specifically, an average value, a maximum value, and a minimum value of an upstream target power spectral density mask value are configured and the configured average value, maximum value, and minimum value of the upstream target power spectral density mask value are used as upstream maximum normal power spectral density in the management information base. Alternatively, an average value, a maximum value, and a minimum value of a downstream target power spectral density mask value are configured and the configured average value, maximum value, and minimum value of the downstream target power spectral density mask value are used as downstream maximum normal power spectral density in the management information base.

Manner 3: Configure a sum of the target power spectral density mask value, and use the configured sum of the target power spectral density mask value as upstream and/or downstream maximum normal power spectral density in a management information base. More specifically, a sum of an upstream target power spectral density mask value is configured the configured sum of the upstream target power spectral density mask value is used as upstream maximum normal power spectral density in the management information base and a sum of a downstream target power spectral density mask value is configured the configured sum of the downstream target power spectral density mask value is used as downstream maximum normal power spectral density in the management information base. Alternatively, a sum of an upstream target power spectral density mask value is configured and the configured sum of the upstream target power spectral density mask value is used as upstream maximum normal power spectral density in the management information base and a sum of a downstream target power spectral density mask value is configured and the configured sum of the downstream target power spectral density mask value is used as downstream maximum normal power spectral density in the management information base.

Manner 4: Calculate an upstream power back-off parameter according to the upstream target power spectral density mask value, and use the calculated upstream power back-off parameter as an upstream power back-off parameter in a management information base.

Manner 5: Configure an upstream maximum signal-to-noise ratio margin to be a value obtained by subtracting the upstream target power spectral density mask value from an actual upstream signal-to-noise ratio margin, or configure a downstream maximum signal-to-noise ratio margin to be a value obtained by subtracting the downstream target power spectral density mask value from an actual downstream signal-to-noise ratio margin.

An embodiment for configuring a port template parameter according to the maximum transmit frequency limit value may be performed in any one of the following manners.

Manner 1: Configure a mask value following the maximum transmit frequency limit value of a power spectral density mask in a management information base as a minimum value defined in the management information base.

If the mask value following the maximum transmit frequency limit value of the power spectral density mask in the management information base is configured to be a minimum value defined in the management information base, which generally is around −100 dBm/Hz, there is no influence on a vectored line after limiting the maximum transmit frequency Manner 2: Configure a radio frequency interference notch (RFI notch) set or a tone blackout set in a management information base to delete a frequency band following the maximum transmit frequency limit value from a transmission set.

Manner 3: Configure a transmission mode in a management information base.

This manner is intended for a condition under which the maximum transmit frequency limit value is less than 2.2 MHz. That is, if the maximum transmit frequency limit value is less than 2.2 MHz, the transmission mode in the management information base may be configured to degrade the transmission mode from VDSL2 to ADSL2+, which may also confine the transmit frequency of the legacy digital subscriber line to be within the maximum transmit frequency range.

Figure 4A:
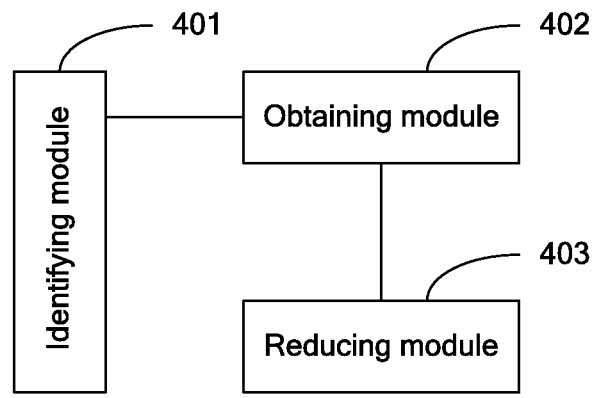
FIG. 4a is a schematic structural diagram of an apparatus for reducing digital subscriber line interference according to an embodiment of the present invention.

Refer to FIG. 4a which is a schematic structural diagram of an apparatus for reducing digital subscriber line interference according to an embodiment of the present invention. For the convenience of description, only parts related to this embodiment of the present invention are shown. The apparatus for reducing digital subscriber line interference illustrated in FIG. 4a may be a central office transceiver unit (VTU-O) in a vectored digital subscriber line system, which includes an identifying module 401, an obtaining module 402, and a reducing module 403.

The identifying module 401 is configured to identify at least one legacy digital subscriber line in a digital subscriber line set, where the digital subscriber line set includes at least one vectored digital subscriber line and the legacy digital subscriber line.

In this embodiment, the digital subscriber line set is a set which includes at least one vectored (Vector) digital subscriber line and may include a legacy (Legacy) digital subscriber line. The legacy (Legacy) digital subscriber line is in contrast to the vectored digital subscriber line in a Vectored-DSL system, and may be, in this embodiment, a line connecting a VTU-O to a VDSL2 customer premises equipment (CPE) that does not support a Vectored-DSL. If power (including upstream power and downstream power) of this type of lines is not limited, the vectored digital subscriber line in the Vectored-DSL system may be affected, for example, by far end crosstalk. Therefore, in order to prevent the legacy digital subscriber line from interfering with the vectored digital subscriber line, a legacy digital subscriber line that may exist in the digital subscriber line set needs to be identified by using the identifying module 401 first.

The obtaining module 402 is configured to obtain a target power spectral density mask value of the legacy digital subscriber line, where the target power spectral density mask value is a reference value for reducing interference of the legacy digital subscriber line on the vectored digital subscriber line.

The target power spectral density mask value is a reference value for reducing interference of the legacy digital subscriber line on the vectored digital subscriber line, and includes an upstream target power spectral density mask value or a downstream target power spectral density mask value. It is a transmit power spectral density (TxPSD) mask value which ensures that an upstream signal or a downstream signal that is transmitted on the legacy digital subscriber line does not cause far end crosstalk on the vectored digital line after transmit power (including upstream power and downstream power) on the legacy digital subscriber line is confined or reduced.

The reducing module 403 is configured to reduce power spectral density of a transmit signal on the legacy digital subscriber line according to the target power spectral density mask value.

According to the apparatus for reducing digital subscriber line interference according to this embodiment of the present invention, after the identifying module identifies the at least one legacy digital subscriber line in the digital subscriber line set, the reducing module may reduce the power spectral density of the transmit signal on the legacy digital subscriber line according to the target power spectral density mask value obtained by the obtaining module. Therefore, compared with the method, which is provided by the prior art, of completely upgrading all VDSL2 Legacy CPEs in an existing VDSL2 network to or replacing them with VDSL2 Vectored CPEs, the method according to this embodiment of the present invention can achieve an effect of eliminating far end crosstalk caused on a Vectored DSL line without upgrading or replacing the VDSL2 Legacy CPEs, thereby avoiding a time cost or a problem caused by an upgrade, and eliminating human and material (such as device) costs caused by the upgrade.

It should be noted that, in the implementation manner of the apparatus for reducing digital subscriber line interference according to the embodiment described above, the division of functional modules are merely described as an example. In an actual application, the functions may be assigned to different functional modules for completion according to actual requirements, for example, according to corresponding hardware configuration requirements or software implementation considerations. That is, the internal structure of the apparatus for reducing digital subscriber line interference is divided into different functional modules to complete all or a part of functions described above. Moreover, in an actual application, a corresponding functional module in this embodiment may be implemented by corresponding hardware or by corresponding hardware executing corresponding software.

For example, the identifying module may be hardware, such as an identifier, having a function of identifying the at least one legacy digital subscriber line in the digital subscriber line set, and may also be a common processor or another hardware device that is capable of executing a corresponding computer program to complete the function. For another example, the reducing module may be hardware, such as a reducer, having a function of reducing the power spectral density of the transmit signal on the legacy digital subscriber line according to the target power spectral density mask value, and may also be a common processor or another hardware device that is capable of executing a corresponding computer program to complete the function (the principle described above is applicable to all embodiments provided by the present invention).

Figure 4B:
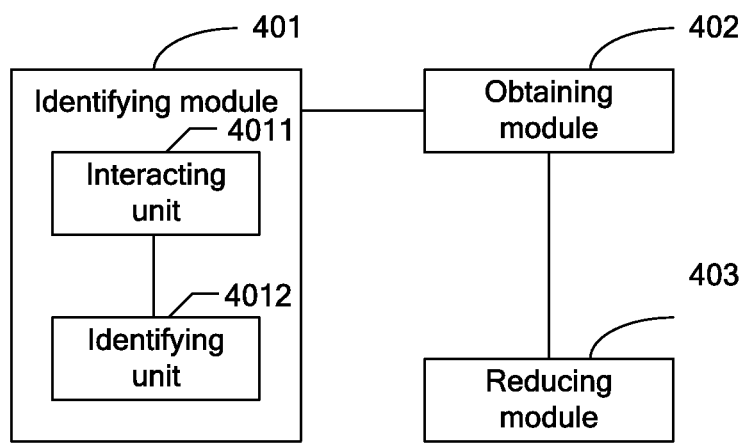
FIG. 4b is a schematic structural diagram of an apparatus for reducing digital subscriber line interference according to another embodiment of the present invention.

The identifying module 401 illustrated in FIG. 4a may further include an interacting unit 4011 and an identifying unit 4012 as in an apparatus, illustrated in FIG. 4b, for reducing digital subscriber line interference according to another embodiment of the present invention.

The interacting unit 4011 is configured to interact with a transceiver unit-remote end on a vectored digital subscriber line to obtain a capability set of a customer premises equipment. The identifying unit 4012 is configured to identify, if the interacting unit 4011 learns, according to the interaction, that a customer premises equipment connected to one digital subscriber line does not support a vectored capability set, that the one digital subscriber line connected to the customer premises equipment is a legacy digital subscriber line. Specifically, in a phase of handshaking between the interacting unit 4011 and the transceiver unit-remote end on the vectored digital subscriber line, the interacting unit 4011 obtains the capability set of the CPE by performing interaction with a VTU-R of the CPE. If the interacting unit 4011 learns, according to the interaction with the VTU-R, that a CPE connected to at least one digital subscriber line does not supported a vectored capability set, the identifying unit 4012 identifies the at least one digital subscriber line connected to the CPE as a legacy digital subscriber line.

Figure 4C:
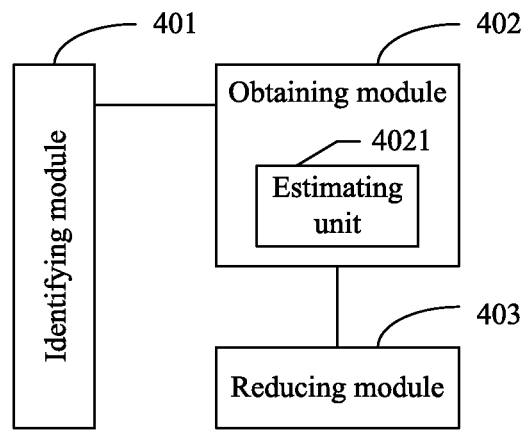
FIG. 4c is a schematic structural diagram of an apparatus for reducing digital subscriber line interference according to another embodiment of the present invention.

The obtaining module 402 illustrated in FIG. 4a may further include an estimating unit 4021, as in an apparatus, illustrated in FIG. 4c, for reducing digital subscriber line interference according to another embodiment of the present invention.

The estimating unit 4021 is configured to estimate a target power spectral density mask value of the legacy digital subscriber line according to a digital subscriber line interference model. For example, according to the digital subscriber line interference model, power of an actually measured strongest-crosstalk attenuation value is around −55 dB generally. If noise power spectral density causing crosstalk on a vectored digital subscriber line is at a level of −135 dBm/Hz, that is, at a level that is equivalent to a background noise, the vectored digital subscriber line is not affected. Therefore, according to the equation, that is a power spectral density mask value of a crosstalk signal=a target power spectral density mask value of a legacy digital subscriber line+a crosstalk attenuation value, the estimating unit 4021 may estimate the target power spectral density mask value of the legacy digital subscriber line to be −80 dBm/Hz without loss of generality, and may estimate the target power spectral density mask value of the legacy digital subscriber line to be within a range from −75 dBm/Hz to −85 dBm/Hz.

Figure 4D:
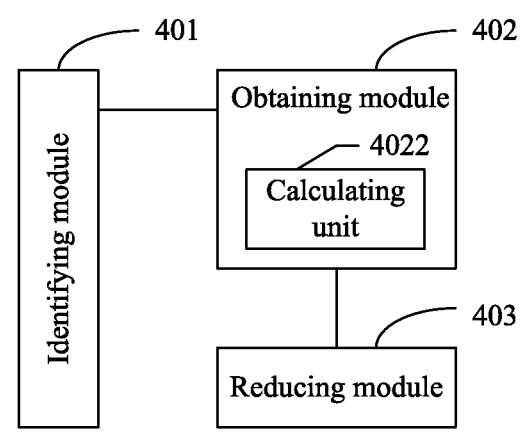
FIG. 4d is a schematic structural diagram of an apparatus for reducing digital subscriber line interference according to another embodiment of the present invention.

The obtaining module 402 illustrated in FIG. 4a may further include a calculating unit 4022 as in an apparatus, illustrated in FIG. 4d, for reducing digital subscriber line interference according to another embodiment of the present invention.

The calculating unit 4022 is configured to calculate a target power spectral density mask value of the legacy digital subscriber line by obtaining a channel parameter of the legacy digital subscriber line. The channel parameter of the legacy digital subscriber line includes channel attenuation (that is, a logarithmic value of channel attenuation, hereinafter expressed by using Hlog), a quiet line noise (QLN), a signal-to-noise ratio margin, a bit allocation table ($b_n$), and a target rate (hereinafter expressed by using TargetRate), and the like. Generally, a rate of a legacy digital subscriber line is low. According to the Shannon's capacity equation:

$$TargetRate = \sum_{n=1}^{N} b_n = \sum_{n=1}^{N} \log_2\left(1 + \frac{10^{\frac{SNR(n)}{10}}}{\Gamma}\right),$$

where n is a serial number of an available tone, N is a maximum serial number of a tone, $\Gamma$ is a difference obtained after a coding gain is subtracted from a sum of a signal-to-noise ratio gap (fixed value) and a signal-to-noise ratio margin.

SNR(n)=TxPSD(n)+H log(n)−QLN(n). The calculating unit 4022 calculates TxPSD(n) and uses the value as the target power spectral density mask value of the legacy digital subscriber line.

Figure 5A:
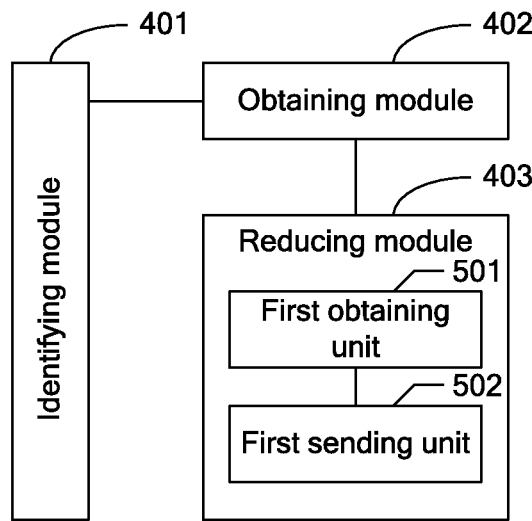
FIG. 5a is a schematic structural diagram of an apparatus for reducing digital subscriber line interference according to another embodiment of the present invention.

The reducing module 403 illustrated in FIG. 4a may further includes a first obtaining unit 501 and a first sending unit 502 as in an apparatus, illustrated in FIG. 5a, for reducing digital subscriber line interference according to another embodiment of the present invention.

The first obtaining unit 501 is configured to use a smaller value between an upstream power spectral density mask value that is obtained last time or during initialization and the upstream target power spectral density mask value to obtain a current upstream power spectral density mask value.

For the convenience of description, the upstream power spectral density mask value is expressed by using "PSDM-SKus". During initialization, the upstream power spectral density mask value has one initialized value. The first obtaining unit 501 may compare the upstream power spectral density mask value that is obtained last time or during the initialization with the upstream target power spectral density limit value, and the smaller value thereof is used as the current upstream power spectral density mask value (the current upstream power spectral density mask value is expressed by using "current_PSDMSKus" herein for the convenience of description), that is, current_PSDMASKus(f)=min [PSDMASKus(f), Cutting PSDMASKus(f)], where "min" indicates that a minimum value is used, a frequency is not an element of RFIBANDS (f∉RFIBANDS), and RFIBANDS refers to a set of radio frequency interference frequency bands.

The first sending unit 502 is configured to send the current upstream power spectral density mask value to a terminal in a digital subscriber line system, so that the terminal reduces, when confining channel discovery power spectral density to be not more than the smallest value in values obtained by subtracting 3.5 dB separately from an upstream maximum mask value during a start phase of a channel discovery phase, an upstream power back-off mask value, and the current upstream power spectral density mask value, power spectral density of an upstream signal on the legacy digital subscriber line.

At the start of the channel discovery phase, the terminal compares, upon receiving the current upstream power spectral density mask, the values obtained by subtracting 3.5 dB separately from the upstream maximum mask value at the start of the channel discovery phase (Channel Discovery maximum mask, CDMAXMASKus), the upstream power back-off mask value (UPBOMASK), and the current upstream power spectral density mask value, and confines the channel discovery phase power spectral density value (Channel Discovery PSD, CDPSD) to be not more than the smaller value in the values obtained by subtracting 3.5 dB separately from the upstream maximum mask value at the start of the channel discovery phase, the upstream power back-off mask value, and the current upstream power spectral density mask value. Specifically, upstream power spectral density at the start of the channel discovery phase (expressed by using "CDPSDus") is confined to be not more than the smaller value in the values obtained by subtracting 3.5 dB separately from the upstream maximum mask value at the start of the channel discovery phase, the upstream power back-off mask value, and the current upstream power spectral density mask value, that is, CDPSDus(f)≤min [(current_PSDMASKus(f)−3.5), (CDMAXMASKus−3.5), (UPBOMASK(kl$_0$, f)−3.5)], f∉RFIBANDS, where RFIBANDS refers to a set of radio frequency interference frequency bands.

Figure 5B:
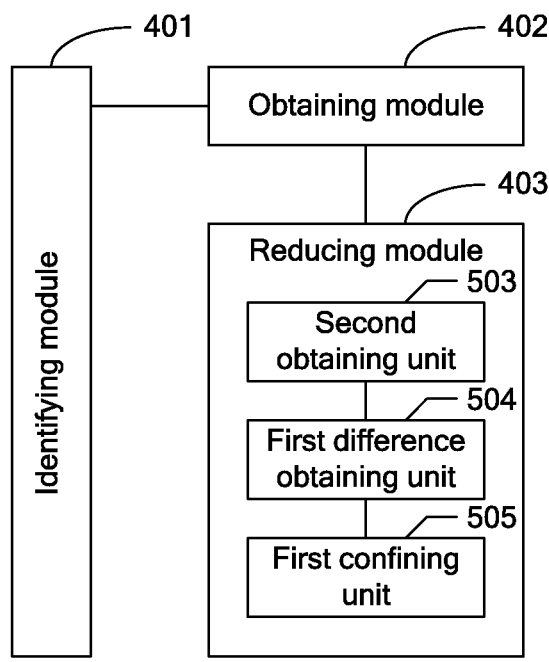
FIG. 5b is a schematic structural diagram of an apparatus for reducing digital subscriber line interference according to another embodiment of the present invention.

The reducing module 403 illustrated in FIG. 4a may further includes a second obtaining unit 503, a first difference obtaining unit 504, and a first confining unit 505 as in an apparatus, illustrated in FIG. 5b, for reducing digital subscriber line interference according to another embodiment of the present invention.

The second obtaining unit 503 is configured to use a smaller value between a downstream power spectral density mask value that is obtained last time or during initialization and a downstream target power spectral density mask value to obtain a current downstream power spectral density mask value.

The downstream power spectral density mask is expressed by using "PSDMASds". During initialization, the downstream power spectral density mask value has one initialized value. The second obtaining unit 503 may compare the downstream power spectral density mask value that is obtained last time or during the initialization with the downstream target power spectral density value, and the smaller value thereof is used as the current downstream power spectral density mask value (the current downstream power spectral density mask value is expressed by using "current_PSDMSKds" herein for the convenience of description), that is, current_PSDMASKds(f)=min [PSDMASKds(f),Cutting PSDMASKds (f)], where "min" indicates that a minimum value is used, a frequency is not an element of RFIBANDS (f∉RFIBANDS), and RFIBANDS refers to a set of radio frequency interference frequency bands.

The first difference obtaining unit 504 is configured to obtain a difference between a smaller value, between a downstream maximum mask value during a start phase of a channel discovery phase and the current downstream power spectral density mask value, and 3.5 dB.

In this embodiment, the downstream maximum mask value at the start of the channel discovery phase may be a preset value.

The first confining unit 505 is configured to reduce, when confining channel discovery power spectral density to be not more than the difference, power spectral density of a downstream signal on the legacy digital subscriber line.

Downstream power is determined by a central office device, for example, a VTU-O. Therefore, reduction of downstream power is completed on the central office device. Specifically, when the first confining unit 505 confines downstream power spectral density at the start of the channel discovery phase (expressed by using "CDPSDds") to be not more than the smaller value between the values obtained by subtracting 3.5 dB separately from the downstream maximum mask value at the start of the channel discovery phase and the current downstream power spectral density mask value, that is, CDPSDds(f)≤min[(current_PSDMASKds(f)−3.5), (CDMAXMASKds−3.5)], f∉RFIBANDS, where RFIBANDS refers to a set of radio frequency interference frequency bands, the first confining unit 505 reduces power spectral density of a downstream signal on the legacy digital subscriber line.

Figure 6A:
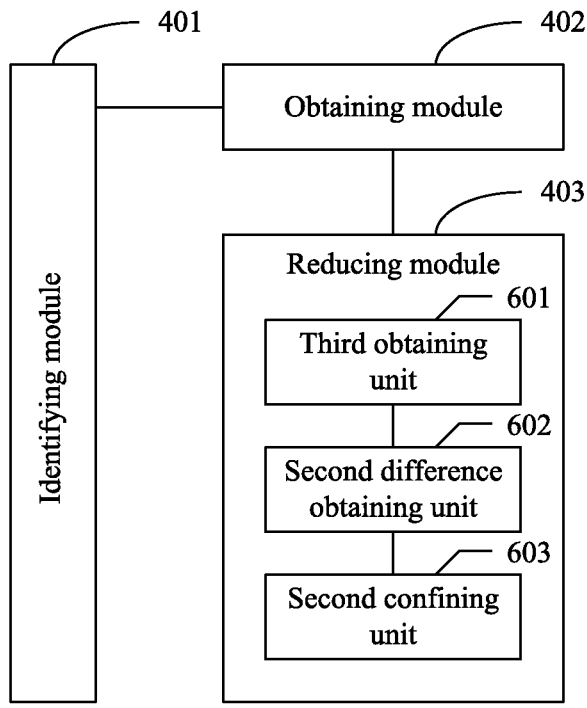
FIG. 6a is a schematic structural diagram of an apparatus for reducing digital subscriber line interference according to another embodiment of the present invention.

The reducing module 403 illustrated in FIG. 4a may further includes a third obtaining unit 601, a second difference obtaining unit 602, and a second confining unit 603 as in an apparatus, illustrated in FIG. 6a, for reducing digital subscriber line interference according to another embodiment of the present invention.

The third obtaining unit 601 is configured to use, if a value obtained by subtracting 3.5 dB from a downstream maximum mask during a start phase of a channel discovery phase, is greater than a downstream target power spectral density mask value, a smaller value between a downstream maximum mask during a start phase of a channel discovery phase that is obtained last time or during initialization and the reduced downstream power spectral density limit value to obtain a current downstream maximum mask during a start phase of a channel discovery phase.

During initialization, the downstream maximum mask at the start of the channel discovery phase has one initialized value. If a value obtained by subtracting 3.5 dB from the initialized value of the downstream maximum mask at the start of the channel discovery phase (CDMAXMASKds) is less than the downstream target power spectral density mask value, power reduction is not required. If a value obtained by subtracting 3.5 dB from the initialized value of the downstream maximum mask at the start of the channel discovery phase (CDMAXMASKds) is greater than the downstream target power spectral density mask value, power reduction needs to be performed.

The third obtaining unit 601 may compare the downstream maximum mask at the start of the channel discovery phase that is obtained last time or the initialized value of the downstream maximum mask at the start of the channel discovery phase (CDMAXMASKds) with the downstream target power spectral density value, and a smaller value thereof is used as the current downstream maximum mask value at the start of the channel discovery phase (the current downstream maximum mask value at the start of the channel discovery phase is expressed by using "current_CDMAXMASKds" herein for the convenience of description), that is, current_CDAMX-MASKds(f)=min [CDMAXMASKds(f), Cutting PSDMASKds(f)], where "min" indicates that a minimum value is used, a frequency is not an element of RFIBANDS (f∉RFIBANDS), and RFIBANDS is a set of radio frequency interference frequency bands.

The second difference obtaining unit 602 is configured to obtain a difference between a smaller value, between a downstream power spectral density mask value and the current downstream maximum mask value at the start of the channel discovery phase, and 3.5 dB.

The second confining unit 603 is configured to confine, when reducing power spectral density of a downstream signal on the legacy digital subscriber line, channel discovery power spectral density CDPSD to be not more than the smaller value between the values obtained by subtracting 3.5 dB separately from the downstream power spectral density mask value and the current downstream maximum mask value at the start of the channel discovery phase.

Downstream power is determined by a central office device, for example, a VTU-O. Therefore, reduction of downstream power is completed on the central office device. Specifically, the second power confining unit 603 confines downstream power spectral density at the start of the channel discovery phase (expressed by using "CDPSDus") to be not more than the smaller value between the values obtained by subtracting 3.5 dB separately from the downstream power spectral density mask value and the current downstream maximum mask value at the start of the channel discovery phase, that is, CDPSDds(f)≤min [(PSDMASKds(f)−3.5), (current_CDMAXMASKds−3.5)], f∉RFIBANDS, where RFIBANDS refers to a set of radio frequency interference frequency bands.

Figure 6B:
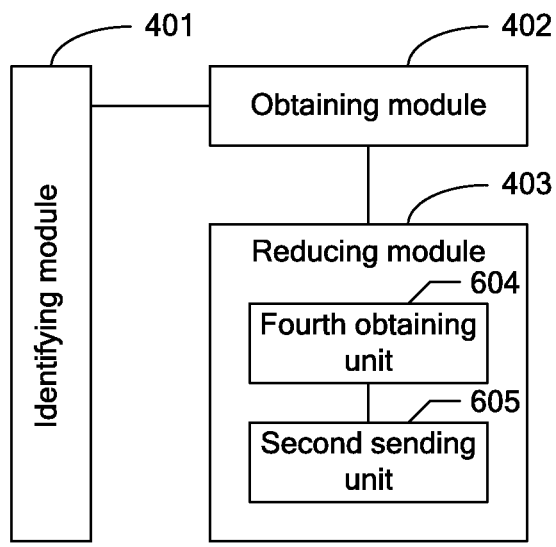
FIG. 6b is a schematic structural diagram of an apparatus for reducing digital subscriber line interference according to another embodiment of the present invention.

The reducing module 403 illustrated in FIG. 4a may further includes a fourth obtaining unit 604 and a second sending unit 605 as in an apparatus, illustrated in FIG. 6b, for reducing digital subscriber line interference according to another embodiment of the present invention.

The fourth obtaining unit 604 is configured to use a smaller value between an upstream maximum mask value during a start phase of a channel discovery phase that is obtained last time or during initialization and an upstream target power spectral density mask value to obtain a current upstream target power spectral density mask value.

During initialization, the upstream maximum mask value at the start of the channel discovery phase has one initialized value. The fourth obtaining unit 604 may compare the upstream maximum mask at the start of the channel discovery phase that is obtained last time or during the initialization with the upstream target power spectral density mask value, and a smaller value thereof is used as the current upstream target power spectral density mask value (a current upstream target power spectral density mask value is expressed by using "current_Cutting PSDMSKus" herein for the convenience of description), that is, current_Cutting PSDMASKus (f)=min [CDMAXMASKus(f), Cutting PSDMASKus(f)], where "min" indicates that a minimum value is used, a frequency is not an element of RFIBANDS (f∉RFIBANDS), and RFIBANDS is a set of radio frequency interference frequency bands.

The second sending unit 605 is configured to send an upstream power back-off mask value and the upstream target power spectral density mask value to a terminal in a digital subscriber line system, so that the terminal reduces, when confining the channel discovery power spectral density CDPSD to be not more than the smallest value in values obtained by subtracting 3.5 dB separately from an upstream power spectral density mask value, the current upstream maximum mask value at the start of the channel discovery phase, and the upstream power back-off mask value, power spectral density of an upstream signal on the legacy digital subscriber line.

At the start of the channel discovery phase, the terminal compares, upon receiving the upstream power back-off mask value and the current upstream target power spectral density mask value, the values obtained by subtracting 3.5 dB separately from the current upstream maximum mask at the start of the channel discovery phase value (Channel Discovery maximum mask, CDMAXMASKus), the upstream power back-off mask value (UPBOMASK), and the upstream power spectral density mask value, and confines the channel discovery phase power spectral density value (Channel Discovery PSD, CDPSD) to be not more than the smallest value in the values obtained by subtracting 3.5 dB separately from the current upstream maximum mask value at the start of the channel discovery phase, the upstream power back-off mask value, and the upstream power spectral density mask value. Specifically, upstream power spectral density at the start of the channel discovery phase (expressed by using "CDPSDus") is confined to be not more than the smaller value in the values obtained by subtracting 3.5 dB separately from the current upstream maximum mask value at the start of the channel discovery phase, the upstream power back-off mask value, and the upstream power spectral density mask value, that is, CDPSDus(f)≤min[(PSDMASKus(f)−3.5), (current_CDMAXMASKus−3.5), (UPBOMASK(kl$_0$, f)−3.5)], f∉RFIBANDS, where RFIBANDS refers to a set of radio frequency interference frequency bands.

Figure 7:
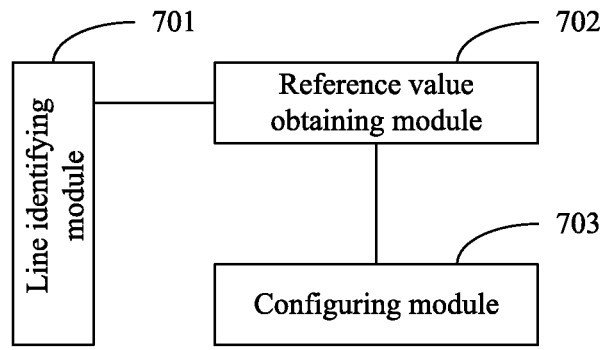
FIG. 7 is a schematic structural diagram of an apparatus for reducing digital subscriber line interference according to another embodiment of the present invention.

Refer to FIG. 7 which is a schematic structural diagram of an apparatus for reducing digital subscriber line interference according to another embodiment of the present invention. For the convenience of description, only parts related to this embodiment of the present invention are shown. The apparatus for reducing digital subscriber line interference illustrated in FIG. 7 may be a vectoring control entity (VCE) in a DSL system, which includes a line identifying module 701, a reference value obtaining module 702, and a configuring module 703.

The line identifying module 701 is configured to identify at least one legacy digital subscriber line in a digital subscriber line set, where the digital subscriber line set includes at least one vectored digital subscriber line and the legacy digital subscriber line.

In this embodiment, the line identifying module 701 may be configured to identify the at least one legacy digital subscriber line in the digital subscriber line set by obtaining prior information. That is, the line identifying module 701 identifies, by obtaining existing prior information of a carrier, such as a version and model of a terminal device or a historical record indicating whether the terminal device is a vectored terminal (the prior information is stored in a database or storing unit of the VCE or is separate from the database or storing unit of the VCE), whether at least one digital subscriber line in the digital subscriber line set is a legacy digital subscriber line.

The reference value obtaining module 702 is configured to obtain a target power spectral density mask value or a maximum transmit frequency limit value of the legacy digital subscriber line, where the target power spectral density mask value is a reference value for reducing interference of the legacy digital subscriber line on the vectored digital subscriber line.

Figure 8A:
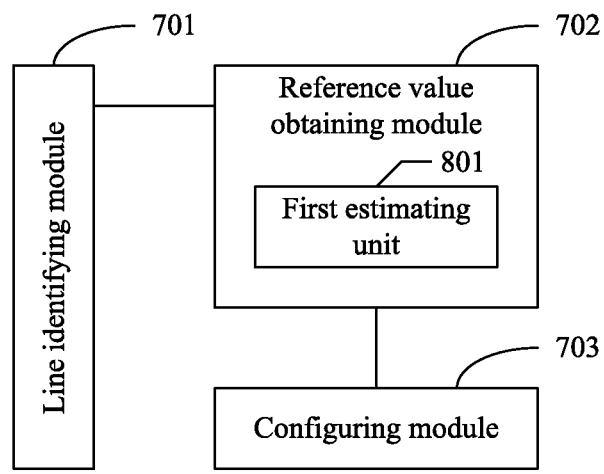
FIG. 8a is a schematic structural diagram of an apparatus for reducing digital subscriber line interference according to another embodiment of the present invention.

The reference value obtaining module 702 illustrated in FIG. 7 may further include a first estimating unit 801 as in an apparatus, illustrated in FIG. 8a, for reducing digital subscriber line interference according to another embodiment of the present invention.

The first estimating unit 801 is configured to estimate the target power spectral density mask value of the legacy digital subscriber line according to a digital subscriber line interference model. As described above, according to the digital subscriber line interference model, power of an actually measured strongest-crosstalk attenuation value is around −55 dB generally; if noise power spectral density causing crosstalk on the vectored digital subscriber line is at a level of −135 dBm/Hz, that is, at a level that is equivalent to a background noise, the vectored digital subscriber line is not affected. Therefore, according to the equation, that is a power spectral density mask value of a crosstalk signal=a target power spectral density mask value of a legacy digital subscriber line+a crosstalk attenuation value, the first estimating unit 801 estimates a target power spectral density mask value of the legacy digital subscriber line to be −80 dBm/Hz without loss of generality, and may estimate the target power spectral density mask value of the legacy digital subscriber line to be within a range from −75 dBm/Hz to −85 dBm/Hz.

Figure 8B:
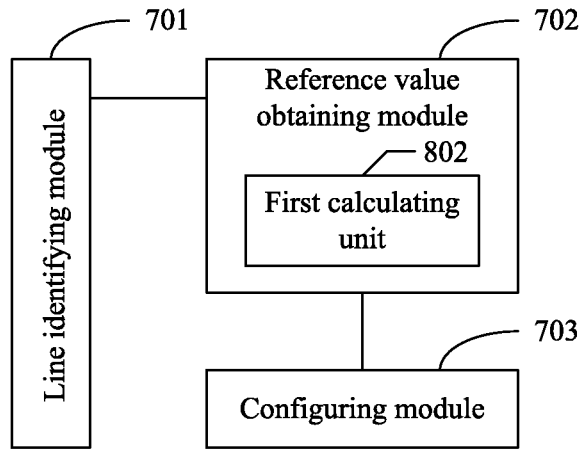
FIG. 8b is a schematic structural diagram of an apparatus for reducing digital subscriber line interference according to another embodiment of the present invention.

The reference value obtaining module 702 illustrated in FIG. 7 may further include a first calculating unit 802 as in an apparatus, illustrated in FIG. 8b, for reducing digital subscriber line interference according to another embodiment of the present invention.

The first calculating unit 802 is configured to calculate the target power spectral density mask value of the legacy digital subscriber line by obtaining a historical channel parameter of the legacy digital subscriber line. The historical channel parameter of the legacy digital subscriber line includes channel attenuation (that is, a logarithmic value of channel attenuation, hereinafter expressed by using Hlog), a quiet line noise (QLN), a signal-to-noise ratio margin, a bit allocation table ($b_n$), and a target rate (hereinafter expressed by using TargetRate), and the like, which are stored before. Generally, a rate of a legacy digital subscriber line is low. According to the Shannon's capacity equation:

$$TargetRate = \sum_{n=1}^{N} b_n = \sum_{n=1}^{N} \log_2\left(1 + \frac{10^{\frac{SNR(n)}{10}}}{\Gamma}\right),$$

where n is a serial number of an available tone, N is a maximum serial number of a tone, $\Gamma$ is a difference obtained after a coding gain is subtracted from a sum of a signal-to-noise ratio gap (fixed value) and a signal-to-noise ratio margin, and $SNR(n)=TxPSD(n)+H\log(n)-QLN(n)$. The first calculating unit 802 calculates $TxPSD(n)$ and uses the value as the target power spectral density mask value of the legacy digital subscriber line.

Figure 8C:
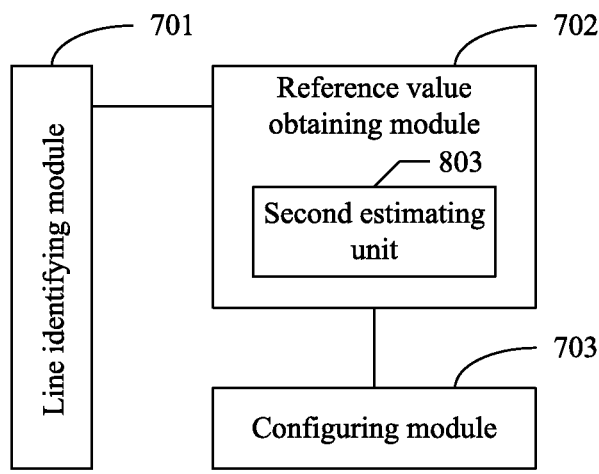
FIG. 8c is a schematic structural diagram of an apparatus for reducing digital subscriber line interference according to another embodiment of the present invention.

The reference value obtaining module 702 illustrated in FIG. 7 may further include a second estimating unit 803 as in an apparatus, illustrated in FIG. 8c, for reducing digital subscriber line interference according to another embodiment of the present invention.

The second estimating unit 803 is configured to estimate the maximum transmit frequency limit value of the legacy digital subscriber line according to a digital subscriber line interference model. According to the digital subscriber line interference model, an operating frequency band of an ADSL ranges from 0 to 1.1 MHz, an operating frequency band of an ADSL2+ ranges from 0 to 2.2 MHz, and an operating frequency band of both a VDSL2 and a Vectored-DSL ranges from 0 to 30 MHz. The ADSL and ADSL2+ operate on lower frequency bands, which have smaller crosstalk, and the frequency bands in use are much less than the operating frequency band of the Vectored-DSL; therefore, crosstalk influence of the ADSL and ADSL2+ on the Vectored-DSL is very small. According to actual measurements, within a line length range of 1000 m, a legacy digital subscriber line may achieve a rate of 10 Mbps when operating on the frequency band from 0 to 1.1 MHz, and may achieve a rate of around 20 Mbps when operating on the frequency band from 0 to 2.2 MHz. At present, most legacy digital subscriber lines are required to have a rate within a range of 20 Mbps. Therefore, the second estimating unit 803 may estimate the maximum transmit frequency limit value, for example, 2.2 MHz, of the legacy digital subscriber line according to the digital subscriber line interference model.

Figure 8D:
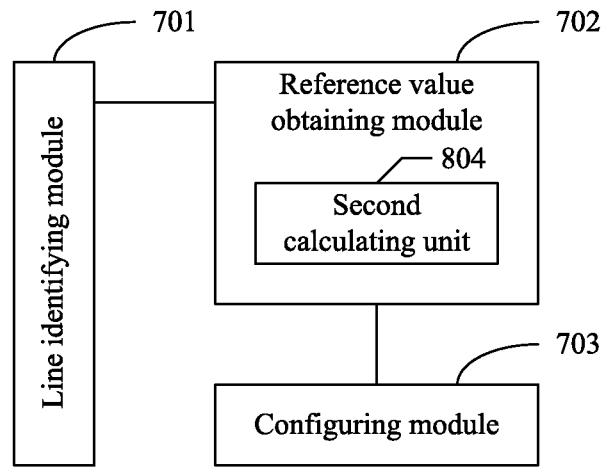
FIG. 8d is a schematic structural diagram of an apparatus for reducing digital subscriber line interference according to another embodiment of the present invention.
Figure 9A:
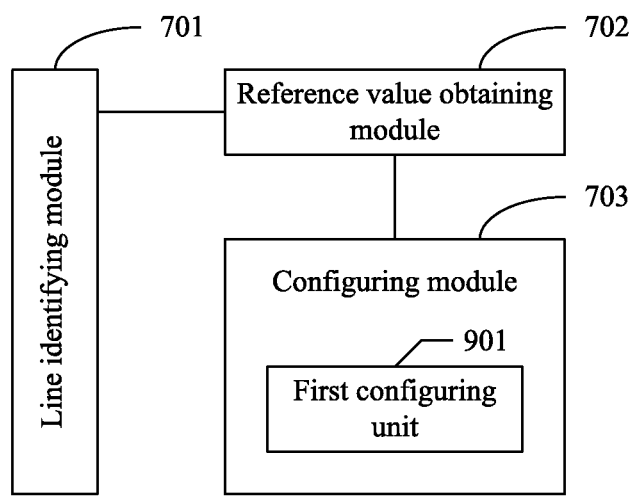
FIG. 9a is a schematic structural diagram of an apparatus for reducing digital subscriber line interference according to another embodiment of the present invention.
Figure 9B:
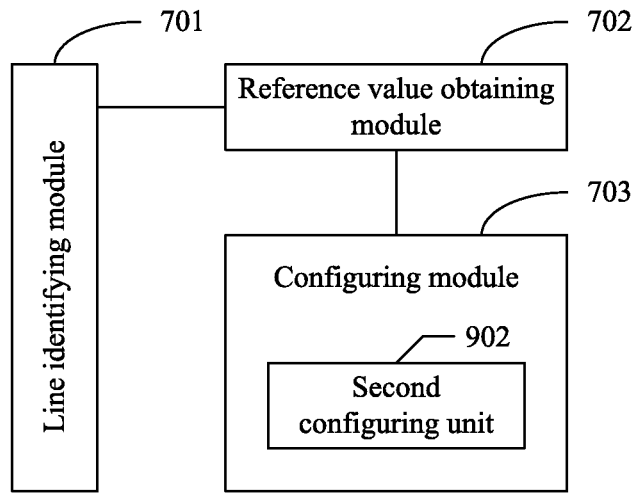
FIG. 9b is a schematic structural diagram of an apparatus for reducing digital subscriber line interference according to another embodiment of the present invention.
Figure 9C:
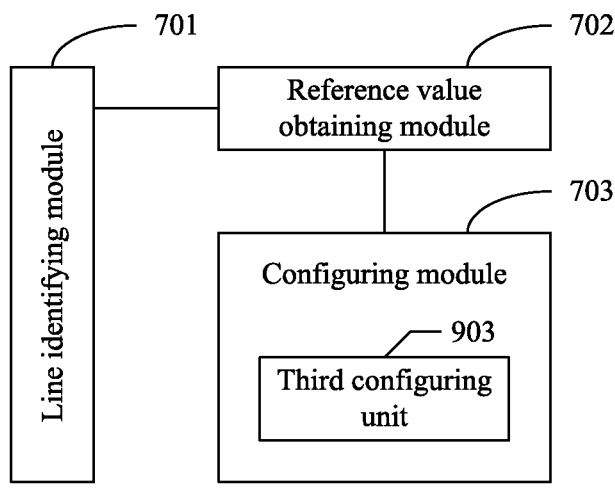
FIG. 9c is a schematic structural diagram of an apparatus for reducing digital subscriber line interference according to another embodiment of the present invention.
Figure 9D:
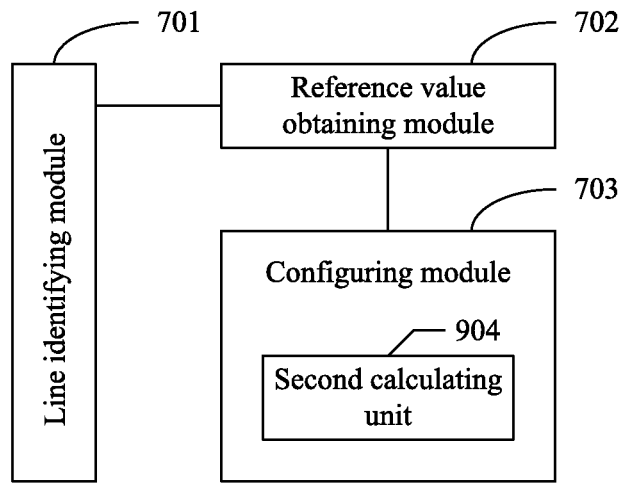
FIG. 9d is a schematic structural diagram of an apparatus for reducing digital subscriber line interference according to another embodiment of the present invention.
Figure 9E:
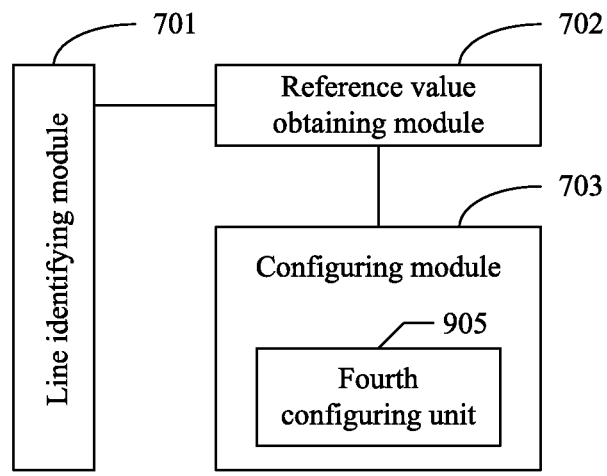
FIG. 9e is a schematic structural diagram of an apparatus for reducing digital subscriber line interference according to another embodiment of the present invention.

The reference value obtaining module 702 illustrated in FIG. 7 may further include a second calculating unit 804 as in an apparatus, illustrated in FIG. 8d, for reducing digital subscriber line interference according to another embodiment of the present invention.

The second calculating unit 804 is configured to calculate the maximum transmit frequency limit value of the legacy digital subscriber line by obtaining a historical channel parameter of the legacy digital subscriber line. Specifically, the second calculating unit 804 obtains the historical channel parameter, including a signal-to-noise ratio (SNR), a bit allocation table ($b_n$), and a target rate, and the like. Generally, a rate of a legacy digital subscriber line is low. According to the Shannon's capacity equation:

$$TargetRate = \sum_{n=1}^{N} b_n = \sum_{n=1}^{N} \log_2\left(1 + \frac{10^{\frac{SNR(n)}{10}}}{\Gamma}\right),$$

where n is a serial number of an available tone, N is a maximum serial number of a tone, $\Gamma$ is a difference obtained after a coding gain is subtracted from a sum of a signal-to-noise ratio gap (fixed value) and a signal-to-noise ratio margin.

A maximum serial number of a tone, N, required by the legacy digital subscriber line is calculated. Hence, the maximum transmit frequency limit value of the legacy digital subscriber line=the maximum serial number of the tone N×a tone width.

The configuring module 703 is configured to configure a port template parameter according to the target power spectral density mask value or the maximum transmit frequency limit value to reduce interference of the legacy digital subscriber line on the vectored digital subscriber line.

The configuring module 703 illustrated in FIG. 7 may further include a first configuring unit 901, a second configuring unit 902, a third configuring unit 903, a second calculating unit 904, or a fourth configuring unit 905 as in an apparatus, illustrated in FIG. 9a to FIG. 9e, for reducing digital subscriber line interference according to another embodiment of the present invention.

The first configuring unit 901 is configured to configure the target power spectral density mask value, and use the configured target power spectral density mask value as an upstream and/or a downstream power spectral density mask value in a management information base, which specifically includes configuring an upstream target power spectral density mask value, and using the configured upstream target power spectral density mask value as an upstream power spectral density mask value in the MIB; configuring a downstream target power spectral density mask value, and using the configured downstream target power spectral density mask value as a downstream power spectral density mask value in the MIB; or configuring an upstream target power spectral density mask value and using the configured upstream target power spectral density mask value as an upstream power spectral density mask value in the MIB, and configuring a downstream target power spectral density mask value and using the configured downstream target power spectral density mask value as a downstream power spectral density mask value in the MIB.

The second configuring unit 902 is configured to configure an average value, a maximum value, or a minimum value of the target power spectral density mask value, and use the configured average value, maximum value, or minimum value of the target power spectral density mask value as upstream or downstream maximum normal power spectral density in a management information base, which specifically includes: configuring an average value, a maximum value, and a minimum value of an upstream target power spectral density mask value, and using the configured average value, maximum value, and minimum value of the upstream target power spectral density mask value as upstream maximum normal power spectral density in the management information base; or configuring an average value, a maximum value, and a minimum value of a downstream target power spectral density mask value, and using the configured average value, maximum value, and minimum value of the downstream target power spectral density mask value as downstream maximum normal power spectral density in the management information base.

The third configuring unit 903 is configured to configure a sum of the target power spectral density mask value, and use the configured sum of the target power spectral density mask value as upstream and/or downstream maximum normal power spectral density in a management information base.

The second calculating unit 904 is configured to calculate the target power spectral density mask value of the legacy digital subscriber line by obtaining a historical channel parameter of the legacy digital subscriber line, which specifically includes: configuring a sum of an upstream target power spectral density mask value, and using the configured sum of the upstream target power spectral density mask value as upstream maximum normal power spectral density in a management information base; configuring a sum of a downstream target power spectral density mask value, and using the configured sum of the downstream target power spectral density mask value as downstream maximum normal power spectral density in the management information base; or configuring a sum of an upstream target power spectral density mask value and using the configured sum of the upstream target power spectral density mask value as upstream maximum normal power spectral density in the management information base, and configuring a sum of a downstream target power spectral density mask value and using the configured sum of the downstream target power spectral density mask value as downstream maximum normal power spectral density in the management information base.

The fourth configuring unit 905 is configured to configure an upstream maximum signal-to-noise ratio margin to be a value obtained by subtracting the upstream target power spectral density mask value from an actual upstream signal-to-noise ratio margin, or configure a downstream maximum signal-to-noise ratio margin to be a value obtained by subtracting the downstream target power spectral density mask value from an actual downstream signal-to-noise ratio margin.

Figure 10A:
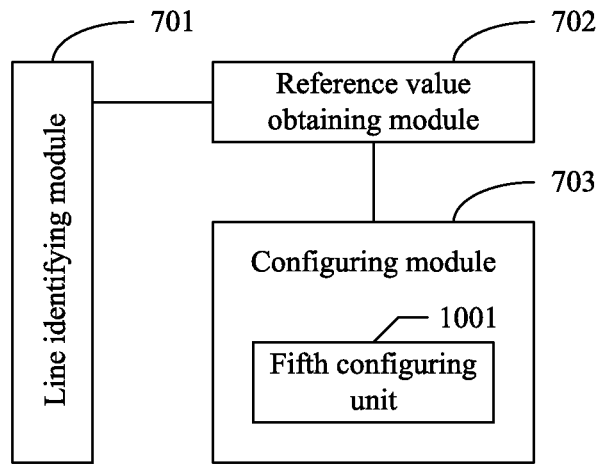
FIG. 10a is a schematic structural diagram of an apparatus for reducing digital subscriber line interference according to another embodiment of the present invention.
Figure 10B:
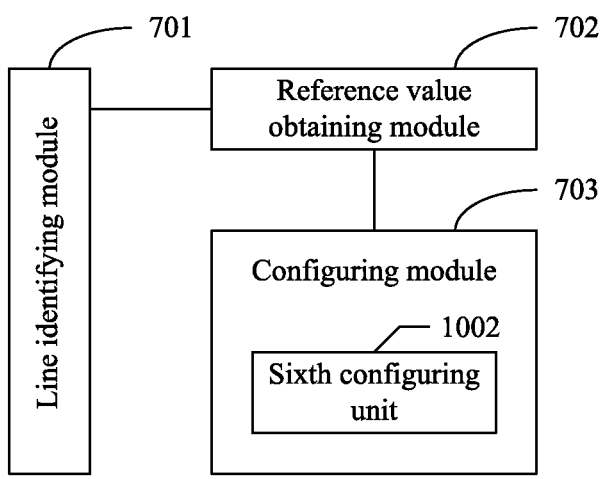
FIG. 10b is a schematic structural diagram of an apparatus for reducing digital subscriber line interference according to another embodiment of the present invention.
Figure 10C:
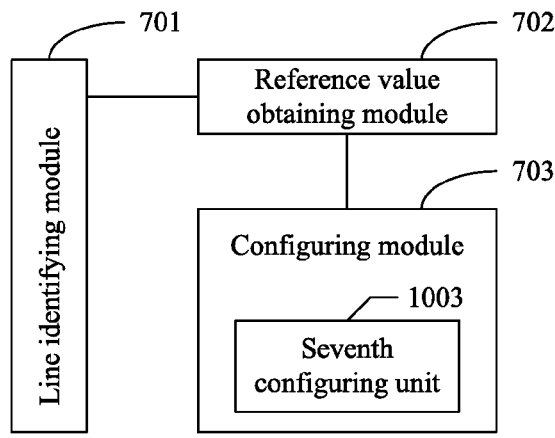
FIG. 10c is a schematic structural diagram of an apparatus for reducing digital subscriber line interference according to another embodiment of the present invention.

The configuring module 703 illustrated in FIG. 7 may further includes a fifth configuring unit 1001, a sixth configuring unit 1002, or a seventh configuring unit 1003 as in an apparatus, illustrated in FIG. 10a to FIG. 10c, for reducing digital subscriber line interference according to another embodiment of the present invention.

The fifth configuring unit 1001 is configured to configure a mask value following the maximum transmit frequency limit value of a power spectral density mask in a management information base as a minimum value defined in the management information base. If the mask value following the maximum transmit frequency limit value of the power spectral density mask in the management information base is configured to be a minimum value defined in the management information base, which normally is around −100 dBm/Hz, there is no influence on a vectored line after limiting the maximum transmit frequency.

The sixth configuring unit 1002 is configured to configure a radio frequency interference notch set (RFI notch) or a tone blackout set (Tone blackout) in a management information base to delete a frequency band following the maximum transmit frequency limit value from a transmission set.

The seventh configuring unit 1003 is configured to configure a transmission mode in a management information base. Regarding a condition under which the maximum transmit frequency limit value is less than 2.2 MHz, that is, if the maximum transmit frequency limit value is less than 2.2 MHz, the seventh configuring unit 1003 may configure the transmission mode in the management information base to degrade the transmission mode from VDSL2 to ADSL2+, which may also confine the transmit frequency of the legacy digital subscriber line to be within the maximum transmit frequency range.

Figure 11:
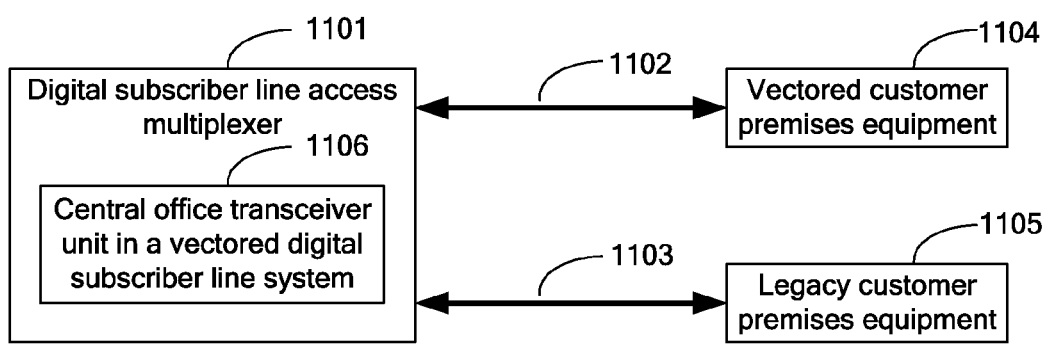
FIG. 11 is a schematic structural diagram of a system for reducing digital subscriber line interference according to an embodiment of the present invention.

Refer to FIG. 11 which illustrates a system for reducing digital subscriber line interference according to an embodiment of the present invention. The system includes a digital subscriber line access multiplexer 1101, at least one vectored digital subscriber line 1102, at least one legacy digital subscriber line 1103, at least one vectored customer premises equipment 1104, and at least one legacy customer premises equipment 1105. The digital subscriber line access multiplexer 1101 may include a central office transceiver unit 1106 in the vectored digital subscriber line system according to any one embodiment illustrated from FIG. 4a to FIG. 6b.

The vectored digital subscriber line 1102 is configured to connect the at least one vectored customer premises equipment 1104 to the central office transceiver unit 1106 in the vectored digital subscriber line system.

The legacy digital subscriber line 1103 is configured to connect the at least one legacy customer premises equipment 1105 to the central office transceiver unit 1106 in the vectored digital subscriber line system.

The vectored customer premises equipment 1104 is configured to interact with the central office transceiver unit 1106 in the vectored digital subscriber line system by using the at least one vectored digital subscriber line 1102.

The customer premises equipment 1105 is configured to interact with the central office transceiver unit 1106 in the vectored digital subscriber line system by using the at least one legacy digital subscriber line 1103.

The central office transceiver unit 1106 in the vectored digital subscriber line system is configured to identify the at least one legacy digital subscriber line 1103 in a digital subscriber line set, obtain a target power spectral density mask value of the legacy digital subscriber line 1103, and reduce power spectral density of a transmit signal on the at least one legacy digital subscriber line 1103 according to the target power spectral density mask value.

It should be noted that content such as information interaction between the modules/units of the apparatus and an executing process described above is based on the same idea as the method embodiments of the present invention, and produces the same technical effects as the method embodiments of the present invention. Hence, the description in the method embodiments of the present invention may be referenced to for the specific content, and will not be described repeatedly herein.

A person of ordinary skill in the art may understand that all or a part of steps of the methods in the foregoing embodiments, for example, one or more or all of the following methods, may be implemented by a program instructing related hardware:

Method 1: identifying at least one legacy digital subscriber line in a digital subscriber line set, where the digital subscriber line set includes at least one vectored digital subscriber line and the legacy digital subscriber line; obtaining a target power spectral density mask value of the legacy digital subscriber line, where the target power spectral density mask value is a reference value for reducing interference of the legacy digital subscriber line on the vectored digital subscriber line; and reducing spectral density of a transmit signal power on the legacy digital subscriber line according to the target power spectral density mask value.

Method 2: identifying at least one legacy digital subscriber line in a digital subscriber line set, where the digital subscriber line set includes at least one vectored digital subscriber line and the legacy digital subscriber line; obtaining a target power spectral density mask value or a maximum transmit frequency limit value of the legacy digital subscriber line, where the target power spectral density mask value is a reference value for reducing interference of the legacy digital subscriber line on the vectored digital subscriber line; and configuring a port template parameter according to the target power spectral density mask value or the maximum transmit frequency limit value to reduce interference of the legacy digital subscriber line on the vectored digital subscriber line.

The program may be stored in a computer readable storage medium. The storage medium may include a read-only memory (ROM), a random access memory (RAM), a magnetic disk, or an optical disc.

The method, apparatus, and system for reducing digital subscriber line interference according to the embodiments of the present invention are described above in details. The principle and embodiments of the present invention are described by using specific examples herein. The description of the foregoing embodiments is merely intended to make the method and core idea of the present invention more comprehensible. Meanwhile, a person of ordinary skill in the art may, based on the idea of the present invention, make modifications with respect to the specific implementation manner and application scope of the present invention. Therefore, the content of the specification shall not be construed to limit the present invention.

What is claimed is:

1. A method for reducing digital subscriber line interference, the method comprising:
    identifying at least one legacy digital subscriber line in a digital subscriber line set, wherein the digital subscriber line set comprises at least one vectored digital subscriber line and the legacy digital subscriber line;
    obtaining a target power spectral density mask value of the legacy digital subscriber line, wherein the target power spectral density mask value is a reference value for reducing interference of the legacy digital subscriber line on the vectored digital subscriber line; and
    reducing power spectral density of a transmit signal on the legacy digital subscriber line according to the target power spectral density mask value;
    wherein obtaining the target power spectral density mask value of the legacy digital subscriber line comprises one of following two modes:
        estimating the target power spectral density mask value of the legacy digital subscriber line according to a digital subscriber line interference model; and
        calculating the target power spectral density mask value of the legacy digital subscriber line by obtaining a channel parameter of the legacy digital subscriber line.

2. The method according to claim 1, wherein identifying at least one legacy digital subscriber line in the digital subscriber line set comprises:
    interacting with a transceiver unit at a remote site of a customer premises equipment to obtain a capability set of the customer premises equipment; and
    identifying that the at least one digital subscriber line connected to the customer premises equipment is a legacy digital subscriber line when, according to the interaction, the customer premises equipment connected to at least one digital subscriber line does not support a vectored capability set.

3. The method according to claim 1, wherein the target power spectral density mask value comprises an upstream target power spectral density mask value and wherein reducing the power spectral density of the transmit signal on the legacy digital subscriber line comprises:
    using a smaller value between an upstream power spectral density mask value that is obtained during a last time or during initialization and the upstream target power spectral density mask value to obtain a current upstream power spectral density mask value; and
    sending the current upstream power spectral density mask value to a terminal in a digital subscriber line system, so that the terminal reduces, when confining channel discovery power spectral density to be not more than the smallest value in values obtained by subtracting 3.5 dB separately from an upstream maximum mask value during a start phase of a channel discovery phase, an upstream power back-off mask value, and the current upstream power spectral density mask value, power spectral density of an upstream signal on the legacy digital subscriber line.

4. The method according to claim 1, wherein the target power spectral density mask value comprises a downstream target power spectral density mask value and wherein reducing the power spectral density of the transmit signal on the legacy digital subscriber line comprises:
using a smaller value between a downstream power spectral density mask value that is obtained last time or during initialization and the downstream target power spectral density mask value to obtain a current downstream power spectral density mask value;
obtaining a difference between a smaller value, between a downstream maximum mask value during a start phase of a channel discovery phase and the current downstream power spectral density mask value, and 3.5 dB; and
reducing power spectral density of a downstream signal on the legacy digital subscriber line when confining channel discovery power spectral density to be not more than the difference.

5. The method according to claim 1, wherein the target power spectral density mask value comprises an upstream target power spectral density mask value and wherein reducing power spectral density of the transmit signal on the legacy digital subscriber line according to the target power spectral density mask value comprises:
using a smaller value between an upstream maximum mask during a start phase of a channel discovery phase that is obtained last time or during initialization and the upstream target power spectral density mask value to obtain a current upstream target power spectral density mask value; and
sending an upstream power back-off mask value and the current upstream target power spectral density mask value to a terminal in a digital subscriber line system, so that the terminal reduces, when confining channel discovery power spectral density to be not more than the smallest value in values obtained by subtracting 3.5 dB separately from an upstream power spectral density mask value, a current upstream maximum mask value at the start of the channel discovery phase, and the upstream power back-off mask value, power spectral density of an upstream signal on the legacy digital subscriber line.

6. The method according to claim 1, wherein a downstream target power spectral density mask value and wherein reducing power spectral density of the transmit signal on the legacy digital subscriber line according to the target power spectral density mask value comprises:
if a value obtained by subtracting 3.5 dB from a downstream maximum mask value during a start phase of a channel discovery phase is greater than the downstream target power spectral density mask value, using a smaller value between a downstream maximum mask value during the start phase of the channel discovery phase that is obtained last time or during initialization and the downstream target power spectral density mask value to obtain a current downstream maximum mask value during the start phase of the channel discovery phase;
obtaining a difference between a smaller value, between a downstream power spectral density mask value and the current downstream maximum mask value at the start of the channel discovery phase, and 3.5 dB; and
when confining channel discovery power spectral density to be not more than the difference, reducing power spectral density of a downstream signal on the legacy digital subscriber line.

7. A method for reducing digital subscriber line interference, comprising:
identifying at least one legacy digital subscriber line in a digital subscriber line set, wherein the digital subscriber line set comprises at least one vectored digital subscriber line and the legacy digital subscriber line;
obtaining a target power spectral density mask value, wherein the target power spectral density mask value is a reference value for reducing interference of the legacy digital subscriber line on the vectored digital subscriber line; and
configuring a port template parameter according to the target power spectral density mask value to reduce interference of the legacy digital subscriber line on the vectored digital subscriber line;
wherein obtaining the target power spectral density mask value of the legacy digital subscriber line comprises one of following two modes:
estimating the target power spectral density mask value of the legacy digital subscriber line according to a digital subscriber line interference model; or
calculating the target power spectral density mask value of the legacy digital subscriber line by obtaining a channel parameter of the legacy digital subscriber line.

8. The method according to claim 7, wherein identifying the at least one legacy digital subscriber line in the digital subscriber line set comprises identifying at least one legacy digital subscriber line in the digital subscriber line set by obtaining prior information.

9. The method according to claim 7, wherein configuring the port template parameter according to a maximum transmit frequency limit value comprises:
configuring a mask value following the maximum transmit frequency limit value of a power spectral density mask in a management information base as a minimum value defined in the management information base; or
configuring a radio frequency interference notch set or a tone blackout set in a management information base to delete a frequency band following the maximum transmit frequency limit value from a transmission set; or
configuring a transmission mode in a management information base.

10. An apparatus comprising a central office transceiver unit in a digital subscriber line system, wherein the apparatus comprises:
an identifying module, configured to identify at least one legacy digital subscriber line in a digital subscriber line set, wherein the digital subscriber line set comprises at least one vectored digital subscriber line and the legacy digital subscriber line;
an obtaining module, configured to obtain a target power spectral density mask value of the legacy digital subscriber line, wherein the target power spectral density mask value is a reference value for reducing interference of the legacy digital subscriber line on the vectored digital subscriber line; and a reducing module, configured to reduce power spectral density of a transmit signal on the legacy digital subscriber line according to the target power spectral density mask value;

wherein the obtaining module comprises an estimating unit that is configured to estimate the target power spectral density mask value of the legacy digital subscriber line according to a digital subscriber line interference model or a calculating unit that is configured to calculate the target power spectral density mask value of the legacy digital subscriber line by obtaining a channel parameter of the legacy digital subscriber line.

11. The apparatus according to claim 10, wherein the identifying module comprises:

an interacting unit, configured to interact with a transceiver unit-remote end of a customer premises equipment to obtain a capability set of the customer premises equipment; and an identifying unit, configured to identify, if the interacting unit learns according to the interaction that the customer premises equipment connected to one digital subscriber line does not support a vectored capability set, that the one digital subscriber line connected to the customer premises equipment is a legacy digital subscriber line.

12. The apparatus according to claim 10, wherein the target power spectral density mask value comprises an upstream target power spectral density mask value or a downstream target power spectral density mask value;

wherein the reducing module comprises a first obtaining unit and a first sending unit;

wherein the first obtaining unit is configured to use a smaller value between an upstream power spectral density mask value that is obtained last time or during initialization and the upstream target power spectral density mask value to obtain a current upstream power spectral density mask value; and wherein the first sending unit is configured to send the current upstream power spectral density mask value to a terminal in a digital subscriber line system, so that the terminal reduces, when confining channel discovery power spectral density to be not more than the smallest value in values obtained by subtracting 3.5 dB separately from an upstream maximum mask value during a start phase of a channel discovery phase, an upstream power back-off mask value, and the current upstream power spectral density mask value, power spectral density of an upstream signal on the legacy digital subscriber line.

13. The apparatus according to claim 10, wherein the target power spectral density mask value comprises an upstream target power spectral density mask value or a downstream target power spectral density mask value;

wherein the reducing module comprises a second obtaining unit, a first difference obtaining unit, and a first confining unit;

wherein the second obtaining unit is configured to use a smaller value between a downstream power spectral density mask value that is obtained last time or during initialization and the downstream target power spectral density mask value to obtain a current downstream power spectral density mask value;

wherein the first difference obtaining unit is configured to obtain a difference between a smaller value, between a downstream maximum mask value during a start phase of a channel discovery phase and the current downstream power spectral density mask value, and 3.5 dB; and wherein the first confining unit is configured to reduce, when confining channel discovery power spectral density to be not more than the difference, power spectral density of a downstream signal on the legacy digital subscriber line.

14. The apparatus according to claim 10, wherein the target power spectral density mask value comprises an upstream target power spectral density mask value or a downstream target power spectral density mask value;

wherein the reducing module comprises a third obtaining unit, a second difference obtaining unit, and a second confining unit;

wherein the third obtaining unit is configured to use, if a value obtained by subtracting 3.5 dB from a downstream maximum mask value during a start phase of a channel discovery phase, is greater than the downstream target power spectral density mask value, a smaller value between a downstream maximum mask value during a start phase of a channel discovery phase that is obtained last time or during initialization and the downstream target power spectral density mask value to obtain a current downstream maximum mask value during a start phase of a channel discovery phase;

wherein the second difference obtaining unit is configured to obtain a difference between a smaller value, between a downstream power spectral density mask value and the current downstream maximum mask value at the start of the channel discovery phase, and 3.5 dB; and wherein the second confining unit is configured to reduce, when confining channel discovery power spectral density to be not more than the difference, power spectral density of a downstream signal on the legacy digital subscriber line.

15. The apparatus according to claim 10, wherein the target power spectral density mask value comprises an upstream target power spectral density mask value or a downstream target power spectral density mask value;

wherein the reducing module comprises a fourth obtaining unit and a second sending unit;

wherein the fourth obtaining unit is configured to use a smaller value between an upstream maximum mask value during a start phase of a channel discovery phase that is obtained last time or during initialization and the upstream target power spectral density mask value to obtain a current upstream target power spectral density mask value; and wherein the second sending unit is configured to send an upstream power back-off mask value and the current upstream target power spectral density mask value to a terminal in a digital subscriber line system, so that the terminal reduces, when confining channel discovery power spectral density to be not more than the smallest value in values obtained by subtracting 3.5 dB separately from an upstream power spectral density mask value, the current upstream maximum mask value at the start of the channel discovery phase, and the upstream power back-off mask value, power spectral density of an upstream signal on the legacy digital subscriber line.

16. An apparatus for reducing digital subscriber line interference, the apparatus comprising:

a line identifying module, configured to identify at least one legacy digital subscriber line in a digital subscriber line set, wherein the digital subscriber line set comprises at least one vectored digital subscriber line and the legacy digital subscriber line;

a reference value obtaining module, configured to obtain a target power spectral density mask value of the legacy digital subscriber line, wherein the target power spectral density mask value is a reference value for reducing interference of the legacy digital subscriber line on the vectored digital subscriber line; and a configuring module, configured to configure a port template parameter according to the target power spectral density mask value to reduce interference of the legacy digital subscriber line on the vectored digital subscriber line;

wherein the reference value obtaining module comprises a first estimating unit that is configured to estimate the target power spectral density mask value of the legacy digital subscriber line according to a digital subscriber line interference model or a first calculating unit that is configured to calculate the target power spectral density mask value of the legacy digital subscriber line by obtaining a historical channel parameter of the legacy digital subscriber line.

17. The apparatus according to claim 16, wherein the line identifying module is configured to identify at least one legacy digital subscriber line in the digital subscriber line set by obtaining prior information.

18. The apparatus according to claim 16, wherein the reference value obtaining module comprises a second estimating unit or a second calculating unit;
wherein the second estimating unit is configured to estimate a maximum transmit frequency limit value of the legacy digital subscriber line according to a digital subscriber line interference model; and
wherein the second calculating unit is configured to calculate the maximum transmit frequency limit value of the legacy digital subscriber line by obtaining a historical channel parameter of the legacy digital subscriber line.

19. The apparatus according to claim 16, wherein the configuring module comprises a fifth configuring unit, a sixth configuring unit, or a seventh configuring unit;
wherein the fifth configuring unit is configured to configure a mask value following a maximum transmit frequency limit value of a power spectral density mask in a management information base as a minimum value defined in the management information base;
wherein the sixth configuring unit is configured to configure a radio frequency interference notch set or a tone blackout set in a management information base to delete a frequency band following the maximum transmit frequency limit value from a transmission set; and
wherein the seventh configuring unit is configured to configure a transmission mode in a management information base.

20. A system comprising:
a digital subscriber line access multiplexer;
at least one vectored digital subscriber line;
at least one legacy digital subscriber line; and
at least one vectored customer premises equipment, and at least one legacy customer premises equipment;
wherein the digital subscriber line access multiplexer comprises a central office transceiver unit in a vectored digital subscriber line system;
wherein the at least one vectored digital subscriber line is configured to connect the at least one vectored customer premises equipment to the central office transceiver unit in the vectored digital subscriber line system;
wherein the at least one legacy digital subscriber line is configured to connect the at least one legacy customer premises equipment to the central office transceiver unit in the vectored digital subscriber line system;
wherein the at least one vectored customer premises equipment is configured to interact with the central office transceiver unit in the vectored digital subscriber line system by using the at least one vectored digital subscriber line;
wherein the at least one legacy customer premises equipment is configured to interact with the central office transceiver unit in the vectored digital subscriber line system by using the at least one legacy digital subscriber line; and
wherein the central office transceiver unit in the vectored digital subscriber line system is configured to identify the at least one legacy digital subscriber line in a digital subscriber line set, to obtain a target power spectral density mask value of the legacy digital subscriber line, and to reduce power spectral density of a transmit signal on the at least one legacy digital subscriber line according to the target power spectral density mask value.

* * * * *